United States Patent
Singh et al.

(10) Patent No.: US 12,201,967 B2
(45) Date of Patent: Jan. 21, 2025

(54) CATALYSTS FOR HYDROGEN PRODUCTION

(71) Applicant: GOLU HYDROGEN TECHNOLOGIES INC., Edmonton (CA)

(72) Inventors: Inder Pal Singh, Edmonton (CA); Shradha Singh, Edmonton (CA); Mykola Kondratenko, Edmonton (CA); Zhiyong Li, Edmonton (CA)

(73) Assignee: GOLU HYDROGEN TECHNOLOGIES INC., Edmonton (CA)

( * ) Notice: Subject to any disclaimer, the term of this patent is extended or adjusted under 35 U.S.C. 154(b) by 630 days.

(21) Appl. No.: 17/608,501

(22) PCT Filed: Apr. 22, 2020

(86) PCT No.: PCT/CA2020/050525
§ 371 (c)(1),
(2) Date: Nov. 3, 2021

(87) PCT Pub. No.: WO2020/223793
PCT Pub. Date: Nov. 12, 2020

(65) Prior Publication Data
US 2022/0250043 A1    Aug. 11, 2022

Related U.S. Application Data

(60) Provisional application No. 62/870,848, filed on Jul. 5, 2019, provisional application No. 62/842,597, filed on May 3, 2019.

(51) Int. Cl.
*B01J 23/83* (2006.01)
*B01J 23/885* (2006.01)
(Continued)

(52) U.S. Cl.
CPC ........... *B01J 23/83* (2013.01); *B01J 23/885* (2013.01); *B01J 23/8871* (2013.01);
(Continued)

(58) Field of Classification Search
CPC ...... B01J 23/83; B01J 23/885; B01J 23/8871; B01J 23/8892; B01J 2523/00;
(Continued)

(56) References Cited

U.S. PATENT DOCUMENTS

| 6,007,700 A | 12/1999 | Alario et al. |
| 6,255,242 B1 | 7/2001 | Umemoto et al. |
| 2015/0314274 A1* | 11/2015 | Shen ........................ B01J 37/18 502/343 |

FOREIGN PATENT DOCUMENTS

| CA | 2666626 | 4/2001 |
| CA | 2389202 | 5/2001 |

(Continued)

OTHER PUBLICATIONS

Grigoryan et al. Inorganic Materials, 2011, 47, 3 ,317-323 (Year: 2011).*
Wang et al. CN101422735A English Translation (Year: 2009).*

*Primary Examiner* — Alexandra M Moore
*Assistant Examiner* — Jordan W Taylor
(74) *Attorney, Agent, or Firm* — Norton Rose Fulbright Canada

(57) ABSTRACT

It is provided solid, heterogeneous catalysts and a method for producing $H_2$ by steam reforming. More particularly, the catalyst comprises at least one metal element of Cu, Ni, Fe, Co, Mo, Mn, Mg, Zr, La, Ce, Ti, Zn and W, having a formula $Cu_aNi_bFe_cCo_dMO_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g and m are >0, h, I, j, k and I are >0 or a, b, c, d, e, f, g, i, and j are
(Continued)

≥0, h, k, I and m are >0 and x is such that the catalyst is electrically neutral. The produced $H_2$ can be used to powered vehicle as described herein.

20 Claims, 6 Drawing Sheets

(51) Int. Cl.
*B01J 23/887* (2006.01)
*C01B 3/32* (2006.01)
*C01B 3/40* (2006.01)

(52) U.S. Cl.
CPC ............... *C01B 3/326* (2013.01); *C01B 3/40* (2013.01); *B01J 2523/00* (2013.01); *C01B 2203/0233* (2013.01); *C01B 2203/0277* (2013.01); *C01B 2203/0283* (2013.01); *C01B 2203/0405* (2013.01); *C01B 2203/0445* (2013.01); *C01B 2203/0872* (2013.01); *C01B 2203/1052* (2013.01); *C01B 2203/1058* (2013.01); *C01B 2203/1076* (2013.01); *C01B 2203/1223* (2013.01); *C01B 2203/1229* (2013.01); *C01B 2203/1288* (2013.01)

(58) Field of Classification Search
CPC ............ B01J 2523/27; B01J 2523/3706; B01J 2523/3712; B01J 2523/47; B01J 2523/48; B01J 2523/72; B01J 2523/842; C01B 3/326; C01B 3/40; C01B 2203/0233; C01B 2203/0261; C01B 2203/0277; C01B 2203/0283; C01B 2203/0405; C01B 2203/043; C01B 2203/0445; C01B 2203/0495; C01B 2203/0872; C01B 2203/1052; C01B 2203/1058; C01B 2203/1076; C01B 2203/1223; C01B 2203/1229; C01B 2203/1288; Y02E 60/50

See application file for complete search history.

(56) References Cited

FOREIGN PATENT DOCUMENTS

| CA | 2389202 A1 | * | 5/2001 | |
| CA | 3129382 | | 8/2020 | |
| CN | 101422735 A | * | 5/2009 | |
| CN | 102198935 | | 9/2011 | |
| WO | WO-2004058634 A2 | * | 7/2004 | .............. B01J 23/48 |
| WO | 2007094766 | | 8/2007 | |
| WO | 2020168418 | | 8/2020 | |

* cited by examiner

CATALYSTS FOR HYDROGEN PRODUCTION

CROSS-REFERENCE TO RELATED APPLICATIONS

The present application is a U.S. National Phase of International Application No. PCT/CA2020/050525, filed on Apr. 22, 2020, and claims benefit of U.S. Provisional Application Nos. 62/842,597 filed May 3, 2019, and 62/870,848 filed Jul. 5, 2019, the content of which are hereby incorporated by reference in their entirety.

TECHNICAL FIELD

It is provided a group of solid, heterogeneous catalysts and a method for hydrogen production.

BACKGROUND

Currently, the world's ever-growing energy demand is almost exclusively fulfilled by fossil fuels, not only because of their outstanding energy-carrying properties but also because of the current world-wide energy infrastructure that is designed to manufacture, distribute and utilize the petroleum fuel in order to support this demand.

The search for alternative power sources has focused attention on the use of electrochemical fuel cells to generate electrical power. Fuel cells are capable of generating electrical power from a fuel stream and an oxygen stream without producing substantial amounts of NOx, SOx and particulate pollutants.

Hydrogen is regarded as one of the key energy solutions for the future, not only because of its energy efficiency for proton exchange membrane fuel cells, but also because its combustion produces no waste stream.

However, the commercial viability of fuel cell systems will depend on the efficiency of the reformers in cleanly converting conventional hydrocarbon fuel sources, such as for example, gasoline, diesel, natural gas, ethane, butane, light distillates, dimethyl ether, methanol, ethanol, propane, naphtha, kerosene, and combinations thereof, to a hydrogen-rich gas stream with increased reliability and decreased cost. The conversion of such fuel sources to a hydrogen-rich gas stream is also important for other industrial processes as well. Several technologies are available for converting such fuels to hydrogen-rich gas streams.

There are many different ways to produce hydrogen, both, from renewable and non-renewable sources. However, handling hydrogen is a complex task. The hydrogen has to be produced, stored, delivered and dispensed to the end users. For systems like electric vehicles with fuel cells, storing hydrogen on-board is not at present a realistic option due to limitations in storage capacity in addition to its inherent explosive nature.

On the other hand, hydrogen can be produced on-board from several liquid fuels. From a technical point of view methanol and ethanol is a very promising high-energy carrying fuel, as they can easily be converted into hydrogen at reasonable temperatures (200-1000° C.), and they are cheap and have high energy density, low carbon content, and easy to transport and store. The steam reforming is considered as the most promising process to produce hydrogen from methanol and ethanol. Availability of low carbon intensity methanol and ethanol from municipal waste and biomass makes it even more attractive and a cleaner alternative.

Currently there are two main categories of catalyst available for alcohol steam reforming, which are non-noble metal (such as copper) and noble metal-based catalysts. Cu-based catalysts have comparatively low tolerance towards temperatures above 300° C. The rapid deactivation of Cu—ZnO based catalysts via sintering of the copper metal at temperatures above 300° C., is a barrier to its practical application in the steam reforming process. In order to prevent the sintering of the Cu crystallites and improve the activities of the Cu-based catalysts, a promoter needs to be introduced to enhance the stability of copper-based catalysts. For example, Cu-based catalysts could be modified with $Al_2O_3$, $ZrO_2$, $Cr_2O_3$, $CeO_2$ and/or $TiO_2$; WO 2013/007993 provides a process for producing $H_2$ by steam reforming of methanol with a solid catalyst comprising a mixed metal oxide. The mixed metal oxide comprising copper, zinc and gallium is made by co-precipitation of nitrate salt of copper, zinc and gallium. In order to keep the low concentration of CO in the product stream the methanol conversion is to be kept at very low level. The maximum methanol conversion achieved is only 33.4%.

Noble metals such as Pd, Pt, and Rh exhibit different performance than copper-based catalysts. Noble metals predominantly catalyze methanol decomposition, transforming methanol to a mixture of CO and $H_2$. A secondary water gas shift (WGS) reaction converts some of the CO to $CO_2$ in the presence of added steam. However, a significant amount of residual CO remains in the hydrogen stream. This makes the use of such metals an unattractive option for processes where hydrogen is utilized in PEM cells that are sensitive to presence of CO in the hydrogen stream. U.S. 2012/0207667 describes a catalyst for steam reforming of methanol, which has a) indium oxide and at least one further metal from the group of palladium, platinum, rhodium and iridium and/or b) an alloy comprising indium and at least one further metal from the group of palladium, platinum, rhodium and iridium as catalytically active substances. U.S. 2019/0127220 reports a catalyst for steam reforming of ethanol, which comprises a noble metal such as Pt or Rh and a transition non-noble metal such as Ni or Co, supported by a carrier comprising Ce, Zr or Al supplemented with K. However, noble metals are expensive and known to be very sensitive to the presence of carbon monoxide, which is generated during the process, such carbon monoxide causing catalyst poisoning (i.e., the partial or total deactivation of the catalyst).

Accordingly, the catalysts known in the art therefore suffer from several shortcomings such as low activity, undesirable side reactions, poor stability, sensitivity to carbon monoxide and steam and/or a need to operate under high temperature condition.

There is thus still a need to be provided with improved catalysts for steam reforming reaction.

SUMMARY

In accordance with one aspect of the disclosure, there is provided a catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g and m are ≥0, h, i, j, k and l are >0 and x is such that the catalyst is electrically neutral; wherein a+b+c+d+e+f+g+h+i+j+k+l+m=1 and 0≤a≤0.32, 0≤b≤0.19, 0≤c≤0.29, 0≤d≤0.16, 0≤e≤0.11, 0≤f≤0.21, 0≤g≤0.32, 0.23≤h≤0.42, 0.01≤i≤0.02, 0.03≤j≤0.10, 0.11≤k≤0.20, 0.11≤l≤0.19 and $0 \leq m \leq 0.04$, x is such that the catalyst is electrically neutral; wherein the metal oxidation state may be $Cu^0$, $Cu^{+1}$, $Cu^{+2}$, $Ni^0$, $Ni^{+2}$, $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

In accordance with another aspect of the disclosure, there is provided a catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g, i, and j are $\geq 0$, h, k, l and m are $>0$ and x is such that the catalyst is electrically neutral; wherein $a+b+c+d+e+f+g+h+i+j+k+l+m=1$ and $0 \leq a \leq 0.32$, $0 \leq b \leq 0.19$, $0 \leq c \leq 0.29$, $0 \leq d \leq 0.16$, $0 \leq e \leq 0.11$, $0 \leq f \leq 0.21$, $0 \leq g \leq 0.32$, $0.23 \leq h \leq 0.42$, $0 \leq i \leq 0.02$, $0 \leq j \leq 0.10$, $0.11 \leq k \leq 0.20$, $0.11 \leq l \leq 0.19$ and $0 < m \leq 0.04$, x is such that the catalyst is electrically neutral; wherein the metal oxidation state may be $Cu^0$, $Cu^{+1}$, $Cu^{+2}$, $Ni^0$, $Ni^{+2}$, $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

In accordance with another aspect of the disclosure, there is provided a method for producing $H_2$ by steam reforming of a carbonaceous material, comprising contacting and reacting the carbonaceous material and water with a solid catalyst, wherein the solid catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l are molar ratios for the respective elements, wherein a, b, c, d, e, f, g and m are 0, h, i, j, k and l are $>0$ and x is such that the catalyst is electrically neutral; wherein $a+b+c+d+e+f+g+h+i+j+k+l+m=1$ and $0 \leq a \leq 0.32$, $0 \leq b \leq 0.19$, $0 \leq c \leq 0.29$, $0 \leq d \leq 0.16$, $0 \leq e \leq 0.11$, $0 \leq f \leq 0.21$, $0 \leq g \leq 0.32$, $0.23 \leq h \leq 0.42$, $0.01 \leq i \leq 0.02$, $0.03 \leq j \leq 0.10$, $0.11 \leq k \leq 0.20$, $0.11 \leq l \leq 0.19$ and $0 \leq m \leq 0.04$, x is such that the catalyst is electrically neutral; wherein the metal oxidation state may be $Cu^0$, $Cu^{+1}$, $Cu^{+2}$, $Ni^0$, $Ni^{+2}$ $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

In accordance with another aspect of the disclosure, there is provided a method for producing $H_2$ by steam reforming of a carbonaceous material, comprising contacting and reacting the carbonaceous material and water with a solid catalyst, wherein the solid catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g, i, and j are 0, h, k, l and m are $>0$ and x is such that the catalyst is electrically neutral; wherein $a+b+c+d+e+f+g+h+i+j+k+l+m=1$ and $0 \leq a \leq 0.32$, $0 \leq b \leq 0.19$, $0 \leq c \leq 0.29$, $0 \leq d \leq 0.16$, $0 \leq e \leq 0.11$, $0 \leq f \leq 0.21$, $0 \leq g \leq 0.32$, $0.23 \leq h \leq 0.42$, $0 \leq i \leq 0.02$, $0 \leq j \leq 0.10$, $0.11 \leq k \leq 0.20$, $0.11 \leq l \leq 0.19$ and $0 < m \leq 0.04$, x is such that the catalyst is electrically neutral; wherein the metal oxidation state may be $Cu^0$, $Cu^{+1}$, $Cu^{+2}$, $Ni^0$, $Ni^{+2}$ $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

In an embodiment, it is provided a catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the elements, wherein a, b, c, d, e, f, g and m are 0, h, i, j, k and l are $>0$ and x is such that the catalyst is electrically neutral.

In an embodiment, it is provided a catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g, i, and j are 0, h, k, l and m are $>0$ and x is such that the catalyst is electrically neutral.

In an embodiment, $a+b+c+d+e+f+g+h+i+j+k+l+m=1$.

In another embodiment, $0 \leq a \leq 0.32$, $0 \leq b \leq 0.19$, $0 \leq c \leq 0.29$, $0 \leq d \leq 0.16$, $0 \leq e \leq 0.11$, $0 \leq f \leq 0.21$, $0 \leq g \leq 0.32$, $0.23 \leq h \leq 0.42$, $0.01 \leq i \leq 0.02$, $0.03 \leq j \leq 0.10$, $0.11 \leq k \leq 0.20$, $0.11 \leq l \leq 0.19$ and $0 \leq m \leq 0.04$.

In another embodiment, $0 \leq a \leq 0.32$, $0 \leq b \leq 0.19$, $0 \leq c \leq 0.29$, $0 \leq d \leq 0.16$, $0 \leq e \leq 0.11$, $0 \leq f \leq 0.21$, $0 \leq g \leq 0.32$, $0.23 \leq h \leq 0.42$, $0 \leq i \leq 0.02$, $0 \leq j \leq 0.10$, $0.11 \leq k \leq 0.20$, $0.11 \leq l \leq 0.19$ and $0 < m \leq 0.04$.

In a further embodiment, metal is selected from the group consisting of Groups IIA, IB, IIB, IIIB, IVB, VIB, VIIB and VIIIB from the periodic table.

In a further embodiment, metal oxidation state is $Cu^0$, $Cu^{+1}$, $Cu^{+2}$, $Ni^0$, $Ni^{+2}$, $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

In a particular embodiment, the catalyst is:

$Cu_{0.16}Ni_{0.16}Zr_{0.32}La_{0.01}Ce_{0.05}Ti_{0.15}Zn_{0.15}O_x$;
$Cu_{0.11}Ni_{0.19}Fe_{0.21}Zr_{0.23}La_{0.01}Ce_{0.03}Ti_{0.11}Zn_{0.11}O_x$;
$Cu_{0.17}Fe_{0.09}Zr_{0.35}La_{0.02}Ce_{0.05}Ti_{0.16}Zn_{0.16}O_x$;
$Cu_{0.08}Ni_{0.08}Fe_{0.06}Co_{0.12}Zr_{0.31}La_{0.01}Ce_{0.04}Ti_{0.15}Zn_{0.14}O_x$;
$Cu_{0.19}Zr_{0.38}La_{0.02}Ce_{0.05}Ti_{0.18}Zn_{0.18}O_x$;
$Ni_{0.19}Zr_{0.38}La_{0.02}Ce_{0.05}Ti_{0.18}Zn_{0.17}O_x$;
$Cu_{0.18}Ni_{0.07}Zr_{0.36}La_{0.02}Ce_{0.05}Ti_{0.17}Zn_{0.16}O_x$;
$Cu_{0.07}Ni_{0.18}Zr_{0.36}La_{0.02}Ce_{0.05}Ti_{0.17}Zn_{0.16}O_x$;
$Cu_{0.32}Zr_{0.32}La_{0.01}Ce_{0.05}Ti_{0.15}Zn_{0.15}O_x$;
$Cu_{0.27}Ni_{0.04}Fe_{0.10}Zr_{0.28}La_{0.01}Ce_{0.04}Ti_{0.13}Zn_{0.13}O_x$;
$Fe_{0.15}Zr_{0.04}La_{0.02}Ce_{0.06}Ti_{0.19}Zn_{0.19}O_x$;
$Cu_{0.15}CO_{0.16}Zr_{0.32}La_{0.01}Ce_{0.05}Ti_{0.15}Zn_{0.15}O_x$;
$Cu_{0.26}Fe_{0.15}Zr_{0.28}La_{0.01}Ce_{0.04}Ti_{0.13}Zn_{0.13}O_x$;
$Cu_{0.23}Fe_{0.26}Zr_{0.24}La_{0.01}Ce_{0.03}Ti_{0.11}Zn_{0.11}O_x$;
$Cu_{0.13}Fe_{0.29}Zr_{0.27}La_{0.01}Ce_{0.04}Ti_{0.13}Zn_{0.13}O_x$;
$Cu_{0.15}Mn_{0.17}Zr_{0.32}La_{0.01}Ce_{0.05}Ti_{0.15}Zn_{0.15}O_x$;
$Cu_{0.16}Mo_{0.11}Zr_{0.34}La_{0.02}Ce_{0.05}Ti_{0.16}Zn_{0.16}O_x$;
$Cu_{0.12}Mg_{0.32}Zr_{0.26}La_{0.01}Ce_{0.04}Ti_{0.12}Zn_{0.12}O_x$;
$Cu_{0.09}Fe_{0.09}Co_{0.09}Zr_{0.35}La_{0.02}Ce_{0.05}Ti_{0.16}Zn_{0.16}O_x$;
$Cu_{0.15}Fe_{0.17}Zr_{0.32}La_{0.01}Ce_{0.05}Ti_{0.15}Zn_{0.15}O_x$;
$Ni_{0.17}Fe_{0.13}Mn_{0.19}Zr_{0.33}La_{0.01}Ce_{0.05}Ti_{0.16}Zn_{0.15}O_x$;
$Fe_{0.19}Zr_{0.38}La_{0.02}Ce_{0.05}Ti_{0.18}Zn_{0.18}O_x$;
$Mn_{0.21}Zr_{0.38}La_{0.02}Ce_{0.05}Ti_{0.18}Zn_{0.17}O_x$;
$Cu_{0.08}Co_{0.09}Mn_{0.09}Zr_{0.35}La_{0.02}Ce_{0.05}Ti_{0.16}Zn_{0.16}O_x$;
$Ni_{0.10}Mn_{0.10}Zr_{0.38}La_{0.02}Ce_{0.05}Ti_{0.18}Zn_{0.17}O_x$;
$Co_{0.11}Zr_{0.42}La_{0.02}Ce_{0.06}Ti_{0.20}Zn_{0.19}O_x$;
$Fe_{0.1}Co_{0.10}Zr_{0.38}La_{0.02}Ce_{0.05}Ti_{0.18}Zn_{0.17}O_x$;
$Co_{0.10}Zr_{0.40}La_{0.02}Ce_{0.10}Ti_{0.19}Zn_{0.19}O_x$;
$Ni_{0.1}Co_{0.10}Zr_{0.38}La_{0.02}Ce_{0.05}Ti_{0.18}Zn_{0.17}O_x$;
$Co_{0.10}Mn_{0.10}Zr_{0.37}La_{0.02}Ce_{0.05}Ti_{0.18}Zn_{0.17}O_x$; or
$Cu_{0.13}Ni_{0.09}Zr_{0.39}Ti_{0.18}Zn_{0.18}W_{0.04}$.

In an embodiment, the catalyst has a surface area between about 10 $m^2/g$ and about 500 $m^2/g$.

In another embodiment, the catalyst has a total pore volume between about 0.01 mL/g and about 1 mL/g.

In an embodiment, the catalyst is in powdered, pelleted, extruded form or coated on a metal or any suitable surface with or without an added binder.

In a particular embodiment, wherein the catalyst has been calcined.

In an embodiment, wherein the catalyst may or may not be reduced by hydrogen prior to use.

It is also provided the use of the catalyst as described herein for the production of hydrogen.

In an embodiment, wherein hydrogen is produced by a methanol decomposition reaction.

In another embodiment, hydrogen is produced by a water gas shift reaction.

In an embodiment, hydrogen is produced by a methanol steam reforming reaction.

In an embodiment, hydrogen is produced by an ethanol steam reforming reaction.

In a further embodiment, hydrogen is produced by a oxidative methanol, oxidative ethanol reforming and/or ethanol steam reforming reaction.

In an embodiment, carbon monoxide is further produced.

In another embodiment, carbon dioxide is further produced.

In an embodiment, low molecular weight hydrocarbons are further produced.

It is also provided a method for producing $H_2$ by steam reforming of a carbonaceous material, comprising contacting and reacting the carbonaceous material and water with a solid catalyst as defined herein.

In an embodiment, the carbonaceous material and water are in a gas phase.

In another embodiment, the gas phase comprises methanol, ethanol, carbon monoxide, water, oxygen, or a combination thereof.

In a further embodiment, the carbonaceous material comprises ethanol, propanol, butanol, diethyl ether, dimethyl ether, glycerol, glycol, methane, ethane, butane, methanol, gasoline, diesel, a light distillate, naphtha, kerosene, or a combination thereof.

In a particular embodiment, the carbonaceous material is methanol or ethanol.

In a further embodiment, the gas phase further comprise oxygen or air diluted with an inert gas.

In an embodiment, the inert gas is nitrogen or argon.

In another embodiment, the reaction is conducted at temperatures between 150° C. and 1000° C.

In a further embodiment, the reaction is conducted at temperatures between 200° C. and 450° C. for methanol, between 300° C. and 1000° C. for ethanol.

In an embodiment, the reaction is conducted at atmospheric pressure or higher pressure.

In an embodiment, the reaction is conducted at a pressure up to 5000 psi, preferably at 2000 or 5000 psi, more preferably below 2000 psi.

In another embodiment, the reaction is conducted with $H_2O$ to alcohol molar ratio in the gas phase equal to or greater than 1.

In an embodiment, the reaction is conducted in a fixed bed reactor or on a catalyst coated surface.

In another embodiment, the reaction is conducted in one stage or two or more successive stages.

In an embodiment, the reaction is conducted with a WHSV of methanol between about 0.1 hr$^{-1}$ and about 30 hr$^{-1}$, preferably with a WHSV of methanol between about 0.5 hr$^{-1}$ and about 20 hr$^{-1}$, more preferably with a WHSV of methanol between about 1 hr$^{-1}$ and about 15 hr$^{-1}$ and the reaction is conducted with a WHSV of ethanol between about 1 hr$^{-1}$ and about 150 hr$^{-1}$, preferably with a WHSV of ethanol between about 2.5 hr$^{-1}$ and about 100 hr$^{-1}$, more preferably with a WHSV of ethanol between about 5 hr$^{-1}$ and about 75 hr$^{-1}$.

In an embodiment, it is provided a process of producing hydrogen ($H_2$) from a carbonaceous material comprising feeding the carbonaceous material and water into a heat exchanger; heating the carbonaceous material and water with a hot gas flow; introducing the heated carbonaceous material and water into the first reactor; converting the heated carbonaceous material and water into $H_2$, $CO_2$, CO, and $CH_4$ In an embodiment, the process described herein further comprises feeding the gases produced in the first reactor including CO into a second reactor and converting said CO and water into $H_2$ and $CO_2$ by a water gas shift reaction, wherein the water is separated from gaseous products in the gas-liquid separator.

In an embodiment, combustible non-hydrogen gases are recuperated from gas products and used to generate heat for heating carbonaceous materials and water.

In another embodiment, water is recuperated after the separation of gaseous products in the gas-liquid separator and recycled.

In a further embodiment, the recycled water is fed with carbonaceous materials into the heat exchanger.

In an embodiment, hydrogen is separated from other gaseous products by conventional methods, including but not limited to, Pressure Swing Adsorption (PSA), Palladium Membrane, Carbon Monoxide Methanation, Dense Thin-Metal Membrane, Electrochemical purifier and or a combination thereof.

In an embodiment, the process described herein further comprising feeding the separated $H_2$ into a fuel cell.

In an embodiment, the fuel cell is an electrochemical fuel cell generating electrical power.

In another embodiment, the process described herein is in a powered vehicle comprising said fuel cell.

In an embodiment, the process described herein further comprising feeding the separated $H_2$ into industry processes, including, but not limited to, a hydrotreating process, a hydrocracking process, a metal refining process, a fertilizer manufacturing process.

BRIEF DESCRIPTION OF THE DRAWINGS

Reference will now be made to the accompanying drawings.

DETAILED DESCRIPTION

Figure 1:
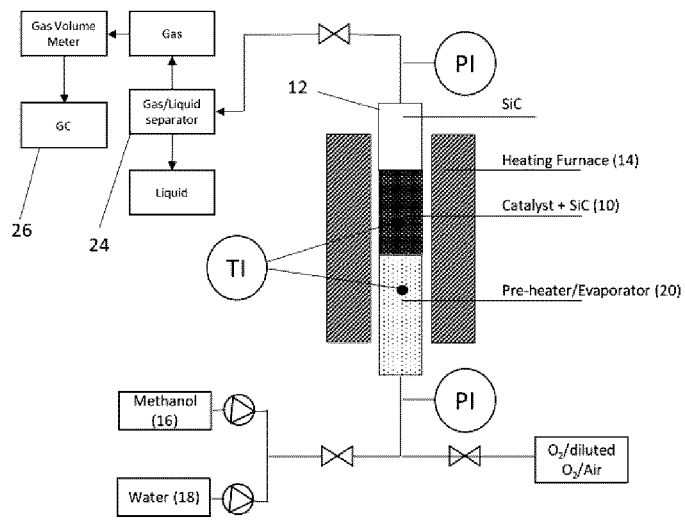
FIG. 1 illustrates a system of methanol reforming for screening solid, heterogeneous catalysts in a single reactor in accordance with one embodiment.

It is provided solid, heterogeneous catalyst preparation for producing $H_2$ via methanol reforming in accordance with the following reactions:

$$CH_3OH \rightarrow CO + 2H_2 \quad \text{(Equation 1)}$$

$$CO + H_2O \rightarrow CO_2 + H_2 \quad \text{(Equation 2)}$$

$$CH_3OH + H_2O \rightarrow CO_2 + 3H_2 \quad \text{(Equation 3)}$$

$$CH_3OH + 0.5H_2O + 0.25O_2 \rightarrow CO_2 + 2.5H_2 \quad \text{(Equation 4)}$$

And ethanol steam reforming in accordance with the following reaction:

$$CH_3CH_2OH \rightarrow CO + CH_4 + H_2 \quad \text{(Equation 5)}$$

$$CH_4 + H_2O \rightarrow CO + 3H_2 \quad \text{(Equation 6)}$$

$$CO + H_2O \rightarrow CO_2 + H_2 \quad \text{(Equation 7)}$$

$$C_2H_5OH + 3H_2O \rightarrow 2CO_2 + 6H_2 \quad \text{(Equation 8)}$$

$$CH_3CH_2OH + 0.5H_2O + 0.25O_2 \rightarrow 2CO_2 + 3.5H_2 \quad \text{(Equation 9)}$$

The solid, heterogeneous catalysts of the present disclosure may be used in methanol or ethanol reforming reaction, which may include methanol decomposition (Equation 1), water gas shift (Equation 2), methanol steam reforming (Equation 3), oxidative methanol and ethanol steam reforming (Equation 4 and Equation 9) and ethanol steam reforming (Equations 5-8) to produce hydrogen which may be used as a fuel or in other chemical transformations requiring added hydrogen.

The term "heterogeneous" as used herein with respect to solid catalysts refers to any solid physical form of suitable catalyst, whether a catalyst is calcined or otherwise hardened, whether provided in powder, pellet, balled, or extruded form or anchored to a solid structure such as a metal surface, ceramics, molecular sieve of natural or synthetic solid-state composition. Such catalysts are generally not solubilized during the reaction and recoverable from the reaction products by simple filtration.

In one embodiment, the catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g and m are ≥0, h, i, j, k and l are >0 and x is such that the catalyst is electrically neutral; wherein a+b+c+d+e+f+g+h+i+j+k+l+m=1 and 0≤a≤0.32, 0≤b≤0.19, 0≤c≤0.29, 0≤d≤0.16, 0≤e≤0.11, 0≤f≤0.21, 0≤g≤0.32, 0.23≤h≤0.42, 0.01≤i≤0.02, 0.03≤j≤0.10, 0.11≤k≤0.20, 0.11≤l≤0.19 and 0≤m≤0.04, x is such that the catalyst is electrically neutral.

one embodiment, the catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g, i, and j are 0, h, k, l and m are ≥0 and x is such that the catalyst is electrically neutral; wherein a+b+c+d+e+f+g+h+i+j+k+l+m=1 and 0≤a≤0.32, 0≤b≤0.19, 0≤c≤0.29, 0≤d≤0.16, 0≤e≤0.11, 0≤f≤0.21, 0≤g≤0.32, 0.23≤h≤0.42, 0≤i≤0.02, 0≤j≤0.10, 0.11≤k≤0.20, 0.11≤l≤0.19 and 0<m≤0.04, x is such that the catalyst is electrically neutral.

In a non-limiting embodiment, the metal oxidation state may be as follows: $Cu^0$, $Cu^{+1}$, $Cu^{+2}$, $Ni^0$, $Ni^{+2}$, $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$ $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$ $Ce^0$, $Ce^{+3}$, $Ce^{+4}$, $W^0$ or $W^{+3}$.

In an embodiment, the solid, heterogeneous catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$ may be prepared using a variety of known methods, including but not limited to, impregnation, ion-exchange, co-precipitation and or physical mixing. While several methods are discussed below, it is appreciated that other suitable methods may be readily apparent to those skilled in the art to obtain the desired composition, shape, surface area and total pore volume of the solid, heterogeneous catalyst.

In an example, the solid, heterogeneous catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$ may be prepared/obtained from any suitable source of its relevant elemental constituents (i.e., the relevant metal(s)) in presence or in absence of a structure directing agent. Suitable sources of the elemental constituents of the at least one metal composition may be compounds such as halides, nitrates, formates, oxalates, citrates, acetates, carbonates, amine complexes, ammonium salts and/or hydroxides and hydrates of the above-mentioned metals (from Group IIA, IB, IIB, IIIB, IVB, VIB, VIIB and VIIIB from the periodic table). A structure directing agent as used herein refers to any structural template that may be used for synthesizing structured materials, such as but not limited to a zeolite with a desired micro, meso or macro pore size.

In an embodiment, the catalyst composition prepared/obtained from the relevant source of elemental constituents may be calcined before and/or after particle aggregation with or without concomitant use of a shaping aid, via an extruding or a pelletizing process, at a temperature between about 200° C. and about 1000° C., preferably at a temperature between about 300° C. and about 900° C., and more preferably at a temperature between about 450° C. and about 750° C. The calcination may be carried out either in the presence of an inert gas, under an oxidizing atmosphere such as air (or another suitable mixture of inert gas and molecular oxygen), under a reducing atmosphere (e.g., a mixture of inert gas, $NH_3$, CO, and/or $H_2$) or under a reduced pressure. The calcination time may be between about 30 mins and about 10 hours, preferably between about 1 hour and about 8 hours, and more preferably between about 2 and about 6 hours, wherein the calcination time generally decreasing with increasing calcination temperature. The calcination time may be further reduced by using certain types of calcination equipment or furnaces and/or by selecting a suitable temperature ramping program.

In an embodiment, the catalyst comprising at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$ has an average surface area of for example between about 10 m²/g and about 500 m²/g and an average pore volume of for example between about 0.01 mL/g and about 1 mL/g. It is appreciated that the catalyst may also exhibit any other suitable average surface area and/or average pore volume in other embodiments.

The process for producing $H_2$ by steam reforming of a carbonaceous material, comprising contacting and reacting the carbonaceous material and water with a solid catalyst, wherein the solid catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g and m are ≥0, h, i, j, k and l are >0 and x is such that the catalyst is electrically neutral; wherein a+b+c+d+e+f+g+h+i+j+k+l+m=1 and 0≤a≤0.32, 0≤b≤0.19, 0≤c≤0.29, 0≤d≤0.16, 0≤e≤0.11, 0≤f≤0.21, 0≤g≤0.32, 0.23≤h≤0.42, 0.01≤i≤0.02, 0.03≤j≤0.10, 0.11≤k≤0.20, 0.11≤l≤0.19 and 0≤m≤0.04, x is such that the catalyst is electrically neutral; wherein the metal oxidation state may be $Cu^0$, $Cu^{+1}$, $Cu^{+2}$, $Ni^0$, $Ni^{+2}$ $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$, $Ce^0$, $Ce^{+3}$, $Ce^{+4}$, $W^0$ or $W^{+3}$.

The process for producing $H_2$ by steam reforming of a carbonaceous material, comprising contacting and reacting the carbonaceous material and water with a solid catalyst, wherein the solid catalyst comprises at least one metal element of Cu, Ni, Fe, Co, Mo, Mn, Mg, Zr, La, Ce, Ti, Zn and W, having a formula $Cu_aNi_bFe_cCo_dMo_eMn_fMg_gZr_hLa_iCe_jTi_kZn_lW_mO_x$, wherein a, b, c, d, e, f, g, h, i, j, k, l and m are molar ratios for the respective elements, wherein a, b, c, d, e, f, g, i, and j are ≥0, h, k, l and m are >0 and x is such that the catalyst is electrically neutral; wherein a+b+c+d+e+f+g+h+i+j+k+l+m=1 and 0≤a≤0.32, 0≤b≤0.19, 0≤c≤0.29, 0≤d≤0.16, 0≤e≤0.11, 0≤f≤0.21, 0≤g≤0.32, 0.23≤h≤0.42, 0≤i≤0.02, 0≤j≤0.10, 0.11≤k≤0.20, 0.11≤l≤0.19 and 0<m≤0.04, x is such that the catalyst is electrically neutral; wherein the metal oxidation state may be $Cu^0$, $Cu^{+1}$, $Cu^{+2}$, $Ni^0$, $Ni^{+2}$ $Co^0$, $Co^{+2}$, $Mo^0$, $Mo^{+2}$, $Mn^0$, $Mn^{+2}$, $Mn^{+3}$, $Mn^{+4}$, $Mg^0$, $Mg^{+2}$, $Mn^{+5}$, $Mn^{+6}$, $Mn^{+7}$, $Fe^0$, $Fe^{+2}$, $Fe^{+3}$, $Ti^0$, $Ti^{+2}$, $Ti^{+3}$, $Ti^{+4}$, $Zn^0$, $Zn^{+1}$, $Zn^{+2}$, $Zr^0$, $Zr^{+4}$, $La^0$, $La^{+3}$. $Ce^0$, $Ce^{+3}$, $Ce^{+4}$, $W^0$ or $W^{+3}$.

In an embodiment, the starting material is in a gas phase. Preferably, the gas phase of starting material may or may not comprise other gases, such as, but not limited to, ethanol, propanol, butanol, diethyl ether, glycerol, glycol, methane, ethane, propane, butane, in addition to the methanol and steam. The gas phase may further comprise oxygen or air further diluted with an inert gas, e.g. nitrogen or argon, which could be present as a carrier gas. Blending oxygen or air into the gas phase may encourage combustion and may also balance the total thermodynamic requirements of the reforming system.

It is thus provided a method for producing $H_2$ by steam reforming of a carbonaceous material, comprising contacting and reacting the carbonaceous material and water with a solid catalyst as defined herein producing hydrogen.

The starting material is a carbonaceous material comprising for example, and not limited to, methanol, ethanol or carbon monoxide, and water, oxygen, or a combination thereof.

In a further embodiment, the carbonaceous material comprises ethanol, propanol, butanol, diethyl ether, dimethyl ether, glycerol, glycol, methane, ethane, butane, methanol, gasoline, diesel, a light distillate, naphtha, kerosene, or a combination thereof.

The process produces a gas fraction containing the hydrogen that may be separated from liquid fraction containing unreacted starting material. The gas fraction may include hydrogen, carbon monoxide, carbon dioxide, methane and trace amount of other hydrocarbons.

In a non-limiting example, the process is conducted at temperatures between 150° C. and 1000° C. Specifically, the process for methanol reforming may be conducted at temperatures between about 150° C. and about 450° C., preferably between about 200° C. and about 400° C., and more preferably between about 250° C. and about 350° C.; The process for ethanol reforming may be conducted at temperatures between about 300° C. and about 1000° C., preferably between about 400° C. and about 900° C., and more preferably between about 450° C. and about 850° C. In general, at higher process temperature alcohol conversion rate increases.

The process may be conducted at atmospheric pressure or higher pressure. In general, at the elevated pressures hydrogen production rate decreases.

The process is conducted with $H_2O$ to alcohol molar ratio in the gas phase equal to or greater than 1. For example, the process for methanol reforming may be conducted with $H_2O$ to methanol molar ratio in said gas phase equal to or greater than 1. In some embodiments however the molar ratio of $H_2O$ to methanol in said gas phase is between 1 and 3, preferably between 1 and 2, and more preferably between 1 and 1.5. The process for ethanol reforming may be conducted with $H_2O$ to methanol ratio in said gas phase equal to or greater than 3. In some embodiments however the molar ratio of $H_2O$ to ethanol in said gas phase is between 3 and 9, preferably between 3 and 7, and more preferably between 3 and 6. In general, higher water to alcohol molar ratio mainly affects reactions by shifting the equilibrium towards the products and, thus, reduces CO and $CH_4$ content in the product stream.

In a fixed bed reactor, the process may be conducted at a WHSV of feed alcohol between about 0.1 h$^{-1}$ and about 150 h$^{-1}$. In general, at higher WHSV hydrogen production rate increases.

Control of the temperature, WHSV of carbonaceous material and water/carbonaceous material ratio in the process may be used to affect the process efficiency (i.e., conversion efficiency (%)), carbon monoxide content (molar percentage of carbon monoxide in the gas phase of product stream, %), methane content (molar percentage of methane in the gas phase of product stream, %) and hydrogen production rate (the volume of produced hydrogen per gram catalyst per hour, $Lg^{-1}h^{-1}$). The conversion efficiency is calculated according to equation (9) below:

$$\text{Conversion} = \frac{\text{mols. of consumed carbon}}{\text{mols. of injected carbon}} \times 100, \quad \text{Equation (9)}$$

where, mols. of consumed carbon=combined mols of $CO+CO_2+CH_4$.

In case where, methanol is a carbonaceous feed stock, mols. of injected carbon=mols of injected methanol.

In case where, ethanol is a carbonaceous feed stock, mols. of injected carbon=2×mols of injected ethanol.

All reagents used in the following examples were of technical grade. Zirconium hydroxide and doped zirconium hydroxide (may contain a trace amount of hafnium) were purchased from Mel Chemicals UK. All other materials were purchased from Aldrich Chemical Co. Reactions were monitored by gas chromatography (GC). conversion (%), carbon monoxide content (%), methane content (%) and hydrogen production rate ($Lg^{-1}h^{-1}$) were calculated based on gas chromatography (GC) by using standard calibration methods.

Example I

General Method of Catalyst Preparation

To prepare a catalyst composition, the relevant mixture of metal oxides or metal oxide precursors obtained from any suitable source of elemental constituents was prepared by either one of the following methods: sol gel, impregnation, ion exchange, coprecipitation, physical mixing and/or a combination thereof, and was subsequently extruded, pelleted or pressed into tablets with tablet pressing machine and then calcined in static or flowing air in a programmable furnace. The calcined pellets were crushed and sieved between 10 and 20 mesh sizes. The coated catalyst was made by standard method such as but not limited to sol gel, Physical Vapor Deposition (PVD) or Chemical Vapor Deposition (CVD) on a metal or any suitable surface and then calcined at 550° C. for 4 hours in static or flowing air. Prior to testing, the calcined Catalyst may or may not be pre-reduced using Temperature Programmed Reduction (TPR) from room temperature to 500° C. under $H_2$ gas stream or 2% $H_2$ diluted with an inert gas for 5 hours. Non-limiting examples of catalyst preparation are provided in Table 1.

Representative Examples of Catalyst Preparation

Catalyst 8: The solution of $Cu(NO_3)_2 \cdot 2.5H_2O$ (9.22 g) and $Ni(NO_3)_2 \cdot 6H_2O$ (32.21 g) in distilled water (25 mL) was impregnated on the mixture of $Ce(OH)_4$ (equivalent to 17 wt % $CeO_2$) and $La(OH)_3$ (equivalent to 5 wt % $La_2O_3$) doped Zirconium hydroxide (40.59 g), $TiO_2$ (8.12 g) and ZnO (8.12 g). The impregnated powder was dried in air for 5 h and at 120° C. overnight and then was pressed into pellets and then calcined at 200° C. for 2 hours and then at 550° C. for 4 hours in static air in a programmable furnace. The calcined pellets were crushed and sieved between 10 and 20 mesh sizes. The catalyst obtained has a surface area of about 71.11 $m^2/g$, a total pore volume of about 0.25 mL/g and a pore size of about 133.39 Å.

Catalyst 12: The solution of $Cu(NO_3)_2 \cdot 2.5H_2O$ (23.79 g) and $Co(NO_3)_2 \cdot 6H_2O$ (32.10 g) in distilled water (25 mL) was impregnated on the mixture of $Ce(OH)_4$ (equivalent to 17 wt % $CeO_2$) and $La(OH)_3$ (equivalent to 5 wt % $La_2O_3$) doped Zirconium hydroxide (40.59 g), $TiO_2$ (8.12 g) and ZnO (8.12 g). The impregnated powder was dried in air for 5 h and at 120° C. overnight and then was pressed into pellets and then calcined at 200° C. for 2 hours and then at 550° C. for 4 hours in static air in a programmable furnace. The calcined pellets were crushed and sieved between 10 and 20 mesh sizes. The catalyst obtained has a surface area of about 75.62 $m^2$ g, a total pore volume of about 0.17 mL/g and a pore size of about 95.91 Å.

TABLE 1

Catalyst Preparation

| | Raw materials used | | | | |
|---|---|---|---|---|---|
| Catalyst Number | $Cu(NO_3)_2 \cdot 2.5H_2O$ (g) | $Ni(NO_3)_2 \cdot 6H_2O$ (g) | $Fe(NO_3)_3 \cdot 9H_2O$ (g) | $Co(NO_3)_2 \cdot 6H_2O$ (g) | $(NH_4)_6Mo_7O_{24} \cdot 4H_2O$ (g) |
| 1 | 25 | 32.21 | 0 | 0 | 0 |
| 2 | 37.58 | 48.1 | 48.84* | 0 | 0 |
| 3 | 25 | 0 | 23.58 | 0 | 0 |
| 4 | 12.48 | 16.15 | 16.49 | 25 | 0 |
| 5 | 25 | 0 | 0 | 0 | 0 |
| 6 | 0 | 32.21 | 0 | 0 | 0 |
| 7 | 25 | 12.5 | 0 | 0 | 0 |
| 8 | 9.22 | 32.21 | 0 | 0 | 0 |
| 9 | 50 | 0 | 0 | 0 | 0 |
| 10 | 50 | 8 | 32.99 | 0 | 0 |
| 11 | 0 | 0 | 24.24* | 0 | 0 |
| 12 | 23.79 | 0 | 0 | 32.1 | 0 |
| 13 | 47.02 | 0 | 47.58 | 0 | 0 |
| 14 | 47.02 | 0 | 94.05 | 0 | 0 |
| 15 | 23.79 | 0 | 94.05 | 0 | 0 |
| 16 | 23.79 | 0 | 0 | 0 | 0 |
| 17 | 23.79 | 0 | 0 | 0 | 11.96 |
| 18 | 23.79 | 0 | 0 | 0 | 0 |
| 19 | 12.48 | 0 | 23.58 | 16.37 | 0 |
| 20 | 23.79 | 0 | 47.02 | 0 | 0 |
| 21 | 0 | 0 | 32.99 | 0 | 0 |
| 22 | 0 | 0 | 38.00 | 0 | 0 |
| 23 | 0 | 0 | 0 | 0 | 0 |
| 24 | 11.89 | 0 | 0 | 16.05 | 0 |

TABLE 1-continued

Catalyst Preparation

| | | | | | |
|---|---|---|---|---|---|
| 25 | 0 | 16.10 | 0 | 0 | 0 |
| 26 | 0 | 0 | 0 | 16.05 | 0 |
| 27 | 0 | 0 | 23.58 | 16.05 | 0 |
| 28 | 0 | 0 | 0 | 16.05 | 0 |
| 29 | 0 | 16.10 | 0 | 16.05 | 0 |
| 30 | 0 | 0 | 0 | 16.05 | 0 |
| 31 | 1.83 | 1.49 | 0 | 0 | 0 |

Raw materials used

| Catalyst Number | $Mn(NO_3)_2 \cdot 4H_2O$ (g) | $MgOAc \cdot 4H_2O$ (g) | $(NH_4)_2Ce(NO_3)_6$ (g) | La and Ce Doped Zirconium hydroxide (g) | $TiO_2$ (g) | ZnO (g) |
|---|---|---|---|---|---|---|
| 1 | 0 | 0 | 0 | 40.59 | 8.12 | 8.12 |
| 2 | 0 | 0 | 0 | 61.01 | 12.2 | 12.2 |
| 3 | 0 | 0 | 0 | 40.59 | 8.12 | 8.12 |
| 4 | 0 | 0 | 0 | 40.59 | 8.12 | 8.12 |
| 5 | 0 | 0 | 0 | 40.59 | 8.12 | 8.12 |
| 6 | 0 | 0 | 0 | 40.59 | 8.12 | 8.12 |
| 7 | 0 | 0 | 0 | 40.59 | 8.12 | 8.12 |
| 8 | 0 | 0 | 0 | 40.59 | 8.12 | 8.12 |
| 9 | 0 | 0 | 0 | 40.59 | 8.12 | 8.12 |
| 10 | 0 | 0 | 0 | 40.59 | 8.12 | 8.12 |
| 11 | 0 | 0 | 0 | 35.71 | 7.14 | 7.14 |
| 12 | 0 | 0 | 0 | 40.59 | 8.12 | 8.12 |
| 13 | 0 | 0 | 0 | 40.59 | 8.12 | 8.12 |
| 14 | 0 | 0 | 0 | 40.59 | 8.12 | 8.12 |
| 15 | 0 | 0 | 0 | 40.59 | 8.12 | 8.12 |
| 16 | 29.7 | 0 | 0 | 40.59 | 8.12 | 8.12 |
| 17 | 0 | 0 | 0 | 40.59 | 8.12 | 8.12 |
| 18 | 0 | 57.34 | 0 | 40.59 | 8.12 | 8.12 |
| 19 | 0 | 0 | 0 | 40.59 | 8.12 | 8.12 |
| 20 | 0 | 0 | 0 | 40.59 | 8.12 | 8.12 |
| 21 | 32.30 | 0 | 0 | 40.59 | 8.12 | 8.12 |
| 22 | 0 | 0 | 0 | 35.71 | 7.14 | 7.14 |
| 23 | 29.70 | 0 | 0 | 40.59 | 8.12 | 8.12 |
| 24 | 14.85 | 0 | 0 | 40.59 | 8.12 | 8.12 |
| 25 | 14.85 | 0 | 0 | 40.59 | 8.12 | 8.12 |
| 26 | 0 | 0 | 0 | 40.59 | 8.12 | 8.12 |
| 27 | 0 | 0 | 0 | 40.59 | 8.12 | 8.12 |
| 28 | 0 | 0 | 12.72 | 40.59 | 8.12 | 8.12 |
| 29 | 0 | 0 | 0 | 40.59 | 8.12 | 8.12 |
| 30 | 14.85 | 0 | 0 | 40.59 | 8.12 | 8.12 |
| 31 | 0 | 0 | 0 | 3.31** | 0.84 | 0.84 |

*$FeCl_2 \cdot 6H_2O$;
**W Doped Zirconium hydroxide

Example II

Catalyst Evaluation
catalysts Screening

Figure 2:
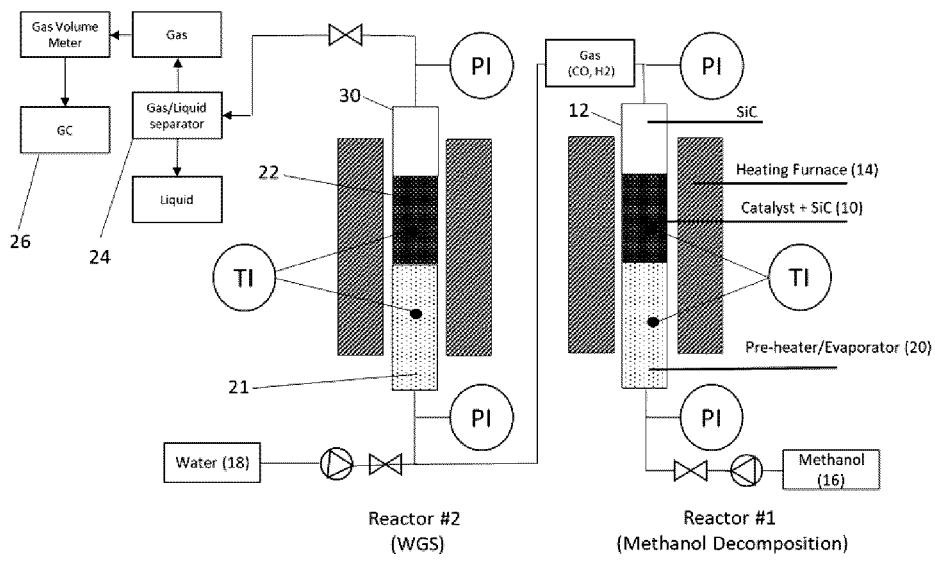
FIG. 2 shows a system for methanol reforming for screening solid, heterogeneous catalysts in two connected reactors in accordance with one embodiment.

The solid, heterogeneous catalyst compositions from table 1 were screened by using a fixed bed reactor system (see FIGS. 1 and 2). The effect of various elements (i.e., the effect of the composition of the heterogeneous catalysts) on the methanol decomposition, water gas shift and steam reforming reactions was determined.

Methanol Decomposition $$CH_3OH \rightarrow CO + 2H_2$$

Determination of catalytic activity in methanol decomposition reaction was carried out in a fixed bed reactor system (FIG. 1). A mixture of 12.5 g catalyst and 16.5 g silicon carbide 10 was placed between glass wool, metal wool, metal frit or metal screen plugs in a ¾-inch diameter stainless-steel reactor 12, fitted with a thermocouple. Reactor 12 is heated with a temperature-programmable furnace 14. Prior to testing, the calcined Catalyst may or may not be pre-reduced using Temperature Programmed Reduction (TPR) from room temperature to 500° C. under $H_2$ gas stream or 2% $H_2$ in $N_2$ at 100 ml/min for 5 hours. Afterwards, methanol 16 was fed using a HPLC pump. Methanol passes through a evaporation zone 20 located at the bottom ⅓ of reactor 12 that is maintained at 300-350° C. where the liquid is converted to vapors before reaching the heated catalyst bed 10 above the preheating zone 20. Hot gaseous effluent existing from the reactor 12 is cooled by passing through a cooling condenser 24 to separate unreacted methanol and/or water, the product gas stream was analyzed on a connected Agilent 7879B gas chromatography 26 equipped with Reformed Gas Analysis (RGA) system. Thus, the $H_2$, CO, $CO_2$ and $CH_4$ gas levels could be quantified directly. Data relating to the methanol conversion on various catalyst compositions, as well as hydrogen production rate, carbon monoxide content and methane content (molar %) in the gas product stream are shown in Table 2.

TABLE 2

Methanol decomposition without water

| Catalyst Number | Temperature (° C.) | WHSV of MeOH ($h^{-1}$) | Methanol Conversion (%) | CO Content (%) | $CH_4$ Content (%) | $H_2$ Production Rate ($Lg^{-1} h^{-1}$) |
|---|---|---|---|---|---|---|
| 1 | 300 | 0.95 | 53 | 26.3 | 0.5 | 0.51 |
|   | 350 | 1.90 | 82.9 | 28.5 | 0.7 | 2.28 |
|   | 350 | 3.79 | 97.7 | 29.5 | 0.8 | 5.17 |
|   | 350 | 5.69 | 77.9 | 27.7 | 0.6 | 6.25 |
| 2 | 300 | 0.47 | 94 | 25.7 | 1.2 | 0.6 |
|   | 350 | 0.47 | 100 | 2.9 | 19.5 | 0.25 |
| 3 | 287 | 3.79 | 55 | 24.3 | 1.1 | 3.13 |
|   | 300 | 0.95 | 98 | 29.9 | 1.3 | 1.24 |
|   | 300 | 3.79 | 30 | 21.8 | 1.4 | 1.93 |
|   | 350 | 3.79 | 97 | 23.5 | 3.9 | 5.26 |
| 4 | 285 | 3.79 | 56 | 23.1 | 0.4 | 2.89 |
| 5 | 350 | 3.79 | 100 | 26.1 | 1.8 | 5.62 |
| 6 | 300 | 0.95 | 71 | 26.4 | 0.4 | 0.79 |
| 7 | 350 | 1.90 | 100 | 29 | 0.9 | 3.16 |
| 8 | 300 | 3.79 | 42 | 27 | 0.4 | 2.69 |
|   | 350 | 3.79 | 100 | 26.6 | 7 | 5.34 |
| 9 | 350 | 0.95 | 97 | 25.7 | 1.5 | 1.43 |
|   | 350 | 1.90 | 51 | 20.6 | 1.7 | 1.64 |
| 10 | 300 | 0.95 | 100 | 2.2 | 1.1 | 1.60 |
|    | 300 | 1.90 | 81 | 1.8 | 0.8 | 2.51 |
| 11 | 400 | 0.95 | 99 | 18.1 | 8.6 | 1.19 |
|    | 490 | 0.95 | 94 | 4.8 | 25.3 | 0.57 |
| 14 | 350 | 0.95 | 92 | 21.9 | 4.6 | 1.18 |
| 16 | 300 | 0.47 | 45 | 23.2 | 1 | 0.41 |
| 17 | 300 | 0.95 | 38 | 7.6 | 10.5 | 0.56 |
| 18 | 250 | 0.47 | 7 | 12.8 | 0 | 0.09 |
|    | 300 | 0.47 | 49 | 25.6 | 0.3 | 0.42 |
|    | 350 | 0.47 | 100 | 27.2 | 0.7 | 0.94 |
| 19 | 300 | 0.95 | 44 | 26.3 | 0.9 | 0.72 |
|    | 350 | 0.95 | 59 | 10.2 | 10.6 | 0.86 |

Water Gas Shift (WGS)

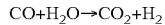

$$CO+H_2O \rightarrow CO_2+H_2$$

Determination of catalytic activity in water gas shift reaction was carried out in a fixed bed reactor system (FIG. 2). A mixture of 12.5 g catalyst and 16.5 g silicon carbide 10 was placed between glass wool, metal wool, metal frit or metal screen plugs in a ¾-inch diameter stainless-steel reactor 12, fitted with a thermocouple. Reactor 12 is heated with a temperature-programmable furnace 14. Prior to testing, the calcined Catalyst may or may not be pre-reduced using Temperature Programmed Reduction (TPR) from room temperature to 500° C. under $H_2$ gas stream or 2% $H_2$ in $N_2$ at 100 ml/min for 5 hours. The mixture of off-gas containing CO and $H_2$, from methanol 16 decomposition reactor loaded with Catalyst 1 (see Table 1) and water 18 which was fed at a certain flow rate generated from an HPLC pump passed through a evaporation zone 21 located at the bottom ⅓ of reactor 30 that is maintained at 300-350° C. where the liquid was converted to vapors before reaching the heated catalyst bed 22 above the preheating zone 20. In addition to the process described in FIG. 1, the mixture of off-gas exiting the reactor 12 then goes through a water gas shift reactor 30 before the hot gaseous effluent existing from the water gas shift reactor 30 was cooled by passing through a cooling condenser 24 to separate unreacted methanol and/or water, the product gas stream was analyzed on a connected Agilent 7879B gas chromatography 26 equipped with Reformed Gas Analysis (RGA) system. Thus, the $H_2$, CO, $CO_2$ and $CH_4$ gas levels could be quantified directly. Data relating to the methanol conversion with various catalyst compositions, as well as hydrogen production rate, carbon monoxide content and methane content (molar %) in the gas product stream are shown in Table 3.

TABLE 3

Water Gas Shift (WGS) reaction

| Catalyst Number | Temperature (° C.) | WHSV of MeOH ($h^{-1}$) | $H_2O$/MeOH Ratio (molar/molar) | Methanol Conversion (%) | CO Content (%) | $CH_4$ Content (%) | $H_2$ Production Rate ($Lg^{-1} h^{-1}$) |
|---|---|---|---|---|---|---|---|
| 1 | 350 | 0.47 | 1.53 | 100 | 4.2 | 3.1 | 0.92 |
|   | 350 | 0.95 | 0.68 | 100 | 15.1 | 0.8 | 1.77 |
| 2 | 300 | 0.47 | 1.53 | 82 | 10.1 | 2.3 | 0.72 |
|   | 350 | 0.47 | 1.53 | 93 | 7 | 7.3 | 0.64 |
| 3 | 300 | 0.47 | 1.53 | 74 | 2.8 | 0.9 | 0.85 |
|   | 300 | 0.95 | 1.22 | 89 | 6.2 | 0.8 | 2.05 |
|   | 300 | 1.90 | 1.51 | 73 | 6.8 | 0.5 | 3.30 |
|   | 300 | 3.79 | 1.20 | 91 | 13.6 | 0.8 | 7.57 |
| 4 | 300 | 0.95 | 1.22 | 100 | 4.1 | 2.2 | 1.65 |

TABLE 3-continued

| | | | Water Gas Shift (WGS) reaction | | | | |
|---|---|---|---|---|---|---|---|
| Catalyst Number | Temperature (° C.) | WHSV of MeOH ($h^{-1}$) | $H_2O$/MeOH Ratio (molar/molar) | Methanol Conversion (%) | CO Content (%) | $CH_4$ Content (%) | $H_2$ Production Rate ($Lg^{-1} h^{-1}$) |
|---|---|---|---|---|---|---|---|
| 5 | 350 | 0.95 | 1.22 | 88 | 3.1 | 0.7 | 1.64 |
|   | 350 | 1.90 | 1.13 | 96 | 7 | 0 | 3.40 |
| 6 | 350 | 0.95 | 1.22 | 97 | 22.1 | 1.2 | 1.50 |
|   | 350 | 1.90 | 1.22 | 100 | 7 | 16.1 | 2.09 |
| 7 | 350 | 0.95 | 1.22 | 100 | 6.3 | 0.9 | 2.00 |
|   | 350 | 1.90 | 1.22 | 100 | 8.6 | 1.1 | 3.94 |
| 8 | 350 | 0.95 | 1.22 | 100 | 9 | 2 | 1.70 |
|   | 350 | 1.90 | 1.22 | 100 | 5.9 | 19.2 | 1.83 |
| 9 | 350 | 0.95 | 1.22 | 88 | 5.7 | 0.6 | 1.89 |
|   | 350 | 1.90 | 1.22 | 59 | 15.8 | 0.6 | 3.63 |
| 10 | 300 | 0.95 | 1.22 | 100 | 3.9 | 1 | 2.03 |
|    | 300 | 1.90 | 1.22 | 100 | 5.4 | 1.3 | 3.85 |
| 11 | 300 | 0.95 | 1.22 | 87 | 28.3 | 0.8 | 1.53 |
|    | 350 | 0.95 | 1.22 | 95 | 16.2 | 0.8 | 1.66 |
|    | 400 | 0.95 | 1.22 | 100 | 9.1 | 0.8 | 1.96 |
|    | 400 | 1.90 | 1.22 | 100 | 11.2 | 0.9 | 3.80 |

Methanol Steam Reforming

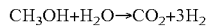

$CH_3OH + H_2O \rightarrow CO_2 + 3H_2$

Determination of catalytic activity in methanol steam reforming reaction was carried out in a fixed bed reactor system as described previously (FIG. 1). A mixture of 12.5 g of catalyst and 16.5 g silicon carbide 10 was placed between glass wool, metal wool, metal frit or metal screen plugs in a ¾-inch diameter stainless-steel tubular reactor 12 equipped with a thermocouple. A temperature-programmable furnace 14 was used to heat the reactor. Prior to testing, the calcined Catalyst may or may not be pre-reduced using a temperature programmed furnace, ramping temperatures from room 20° C. to 500° C. under $H_2$ gas stream or 2% $H_2$ in $N_2$ at 100 ml/min for 5 hours. A liquid mixture of methanol 16 and water 18 in ratios presented in Table 4 were injected at the bottom of the reactor using a HPLC pumps. Reactants were evaporated in the bottom preheating zone of the reactor prior to reaching the catalyst bed 10 located in the middle of the reactor as described previously. Hot gaseous effluents from the reactor 12 were cooled down by passing through a cooling condenser 24. The liquid product was separated from the gases and collected and analyzed. Data relating to the methanol conversion with various catalyst compositions, as well as hydrogen production rate, carbon monoxide content and methane content (molar %) in the gas product stream are shown in Table 4.

TABLE 4

| | | | Methanol Steam Reforming Reaction | | | | |
|---|---|---|---|---|---|---|---|
| Catalyst Number | Temperature (° C.) | WHSV of MeOH ($h^{-1}$) | $H_2O$/MeOH Ratio (molar/molar) | Methanol Conversion (%) | CO Content (%) | $CH_4$ Content (%) | $H_2$ Production Rate ($Lg^{-1} h^{-1}$) |
|---|---|---|---|---|---|---|---|
| 1 | 300 | 0.47 | 1.53 | 88 | 7.20 | 0.10 | 1.11 |
|   | 350 | 1.08 | 1.46 | 81 | 6.60 | 0.10 | 2.51 |
|   | 350 | 0.95 | 1.22 | 100 | 14.00 | 0.20 | 2.30 |
|   | 350 | 1.90 | 1.22 | 87 | 11.30 | 0.30 | 4.06 |
|   | 350 | 3.79 | 1.20 | 89 | 14.50 | 0.70 | 8.04 |
| 2 | 300 | 0.47 | 1.53 | 100 | 12.50 | 1.30 | 0.89 |
|   | 300 | 1.61 | 1.46 | 89 | 16.40 | 0.50 | 2.64 |
| 3 | 300 | 0.95 | 1.22 | 91 | 3.50 | 0.20 | 2.05 |
|   | 300 | 1.90 | 1.19 | 73 | 1.70 | 0.10 | 3.43 |
|   | 300 | 3.79 | 1.76 | 100 | 3.30 | 0.10 | 8.81 |
|   | 300 | 4.74 | 1.76 | 80 | 3.60 | 0.80 | 8.71 |
| 4 | 285 | 1.90 | 1.19 | 80 | 11.70 | 0.20 | 3.41 |
|   | 300 | 0.95 | 1.22 | 100 | 7.60 | 0.80 | 2.15 |
| 5 | 350 | 1.90 | 1.22 | 97 | 6.00 | 0.00 | 4.48 |
|   | 350 | 2.84 | 1.20 | 100 | 6.90 | 0.00 | 6.61 |
| 6 | 350 | 1.90 | 1.22 | 100 | 3.40 | 19.90 | 1.71 |
| 7 | 350 | 1.90 | 1.22 | 100 | 12.20 | 0.20 | 4.26 |
|   | 350 | 0.95 | 1.22 | 97 | 9.60 | 0.20 | 2.08 |
| 8 | 350 | 0.95 | 1.22 | 100 | 3.70 | 22.20 | 0.82 |
|   | 300 | 1.90 | 1.22 | 88 | 16.70 | 3.00 | 3.13 |
| 9 | 350 | 0.95 | 1.22 | 100 | 5.60 | 0.00 | 2.20 |
|   | 350 | 1.90 | 1.22 | 99 | 6.40 | 0.00 | 4.37 |
|   | 350 | 3.79 | 1.20 | 98 | 10.40 | 0.00 | 8.40 |
| 10 | 300 | 1.90 | 1.22 | 100 | 9.60 | 2.60 | 3.95 |
|    | 300 | 3.79 | 1.20 | 96 | 13.70 | 1.20 | 7.75 |

TABLE 4-continued

Methanol Steam Reforming Reaction

| Catalyst Number | Temperature (° C.) | WHSV of MeOH ($h^{-1}$) | $H_2O$/MeOH Ratio (molar/molar) | Methanol Conversion (%) | CO Content (%) | $CH_4$ Content (%) | $H_2$ Production Rate ($Lg^{-1} h^{-1}$) |
|---|---|---|---|---|---|---|---|
| 11 | 350 | 0.95 | 1.22 | 67 | 1.80 | 1.10 | 1.48 |
|  | 400 | 0.95 | 1.22 | 95 | 8.80 | 2.40 | 1.82 |
|  | 400 | 2.40 | 0.96 | 100 | 7.50 | 1.80 | 3.86 |
| 12 | 300 | 0.95 | 1.17 | 100 | 4.60 | 0.70 | 1.83 |
|  | 300 | 1.90 | 1.22 | 94 | 7.30 | 0.50 | 3.86 |
|  | 300 | 3.79 | 1.22 | 100 | 5.40 | 0.10 | 8.50 |
|  | 300 | 7.58 | 1.20 | 93 | 5.50 | 0.10 | 16.13 |
|  | 300 | 11.38 | 1.20 | 88 | 6.10 | 0.10 | 23.41 |
| 13 | 300 | 0.95 | 1.17 | 75 | 0.70 | 0.00 | 1.76 |
|  | 350 | 0.95 | 1.17 | 100 | 3.60 | 0.10 | 2.24 |
|  | 300 | 1.90 | 1.22 | 55 | 0.50 | 0.10 | 2.72 |
|  | 300 | 3.79 | 1.22 | 56 | 0.50 | 0.00 | 5.40 |
|  | 300 | 7.58 | 1.20 | 54 | 0.60 | 0.00 | 9.95 |
| 14 | 300 | 0.95 | 1.17 | 86 | 1.70 | 0.10 | 2.05 |
|  | 350 | 0.95 | 1.17 | 100 | 7.90 | 0.10 | 2.23 |
|  | 300 | 3.79 | 1.22 | 72 | 1.00 | 0.20 | 6.93 |
|  | 300 | 7.58 | 1.20 | 73 | 1.10 | 0.20 | 13.71 |
|  | 300 | 11.38 | 1.20 | 73 | 1.80 | 0.30 | 19.25 |
|  | 300 | 15.17 | 1.20 | 68 | 2.40 | 0.40 | 25.54 |
| 15 | 300 | 0.95 | 1.17 | 82 | 1.30 | 0.10 | 2.02 |
|  | 350 | 0.95 | 1.17 | 100 | 5.00 | 0.50 | 2.30 |
|  | 300 | 1.90 | 1.22 | 64 | 0.50 | 0.10 | 3.26 |
|  | 300 | 3.79 | 1.22 | 52 | 0.50 | 0.10 | 5.08 |
|  | 300 | 7.58 | 1.20 | 33 | 0.60 | 0.20 | 6.62 |
|  | 300 | 11.38 | 1.20 | 32 | 0.70 | 0.30 | 10.04 |
|  | 350 | 15.17 | 1.20 | 41 | 3.50 | 0.60 | 15.15 |
| 16 | 300 | 0.95 | 1.17 | 100 | 4.40 | 0.00 | 2.39 |
|  | 350 | 0.95 | 1.17 | 98 | 7.70 | 0.00 | 2.35 |
|  | 300 | 1.90 | 1.22 | 97 | 6.80 | 0.00 | 5.34 |
|  | 300 | 3.79 | 1.22 | 90 | 4.90 | 0.00 | 8.64 |
|  | 300 | 7.58 | 1.20 | 86 | 3.50 | 0.00 | 16.84 |
|  | 300 | 11.38 | 1.20 | 73 | 1.90 | 0.00 | 23.94 |
|  | 300 | 15.17 | 1.20 | 71 | 2.40 | 0.00 | 29.70 |
| 17 | 275 | 0.95 | 1.17 | 22 | 0.20 | 1.10 | 2.02 |
|  | 300 | 0.95 | 1.17 | 57 | 0.20 | 1.40 | 5.05 |
|  | 350 | 0.95 | 1.17 | 100 | 1.00 | 2.60 | 8.02 |
|  | 300 | 7.58 | 1.20 | 63 | 0.80 | 6.20 | 4.00 |
|  | 350 | 7.58 | 1.20 | 95 | 0.90 | 7.00 | 5.89 |
| 18 | 300 | 0.95 | 1.17 | 69 | 1.00 | 0.00 | 7.12 |
|  | 350 | 0.95 | 1.17 | 95 | 4.50 | 0.00 | 8.82 |
|  | 300 | 1.90 | 1.22 | 59 | 0.70 | 0.00 | 6.36 |
|  | 350 | 1.90 | 1.22 | 95 | 4.50 | 0.00 | 8.99 |
|  | 300 | 3.79 | 1.22 | 61 | 0.90 | 0.00 | 6.05 |
| 19 | 350 | 3.79 | 1.22 | 100 | 3.80 | 0.00 | 9.36 |
|  | 300 | 0.95 | 1.17 | 70 | 10.00 | 2.50 | 5.21 |
|  | 350 | 0.95 | 1.17 | 91 | 2.30 | 9.80 | 5.02 |
|  | 300 | 3.79 | 1.22 | 68 | 3.70 | 1.90 | 5.22 |
|  | 350 | 3.79 | 1.22 | 100 | 8.70 | 22.60 | 3.23 |
| 20 | 300 | 1.90 | 1.20 | 74 | 1.30 | 0.10 | 3.36 |
|  | 350 | 1.90 | 1.20 | 100 | 6.80 | 0.20 | 4.14 |

Ethanol Steam Reforming $$C_2H_5OH + 3H_2O \rightarrow 2CO_2 + 6H_2$$

Determination of catalytic activity in ethanol steam reforming, reaction was carried out in a fixed bed reactor system similar to what has been described before (FIG. 6). A mixture of 1 g of catalyst and 14 g silicon carbide 10 was placed between glass wool, metal wool, metal frit or metal screen plugs in a ¾-inch diameter stainless-steel tubular reactor 12 equipped with a thermocouple. A temperature-programmable furnace 14 was used to heat the reactor 12. Prior to testing, the calcined Catalyst may or may not be pre-reduced using a temperature programmed furnace, ramping temperatures from room 20° C. to 500° C. under $H_2$ gas stream or $H_2$ gas stream diluted with nitrogen or an inert gas at 100 ml/min for 5 hours. A liquid mixture of ethanol and water 36 in 1:5 molar ratio (40% vol % of ethanol) were injected at the bottom of the reactor using a HPLC pump. Reactants were evaporated in the bottom preheating zone 20 of the reactor prior to reaching the catalyst bed 10 located in the middle of the reactor. Hot gaseous effluents from the reactor 12 were cooled down by passing through a cooling condenser 24 after passage by the water gas shift reactor 30. The liquid product was separated from the gases and collected and analyzed. Gas stream was analyzed using an Agilent 7879B gas chromatography 26 equipped with Reformed Gas Analysis (RGA) system equipped with detectors to detect and quantify $H_2$, CO, $CO_2$ and $CH_4$ and low molecular weight gaseous hydrocarbons. Thus, the $H_2$, CO, $CO_2$ and $CH_4$ gas levels could be quantified directly. Data relating to the ethanol conversion with various catalyst compositions, as well as hydrogen production rate, carbon monoxide content and methane content (molar %) in the gas product stream are shown in Table 5.

TABLE 5

Ethanol Steam Reforming Reaction

| Catalyst Number | Temperature (° C.) | WHSV of EtOH (h$^{-1}$) | H$_2$O/EtOH Ratio (molar/molar) | Ethanol Conversion (%) | CO Content (%) | CH$_4$ Content (%) | H$_2$ Production Rate (Lg$^{-1}$ h$^{-1}$) |
|---|---|---|---|---|---|---|---|
| 12 | 300 | 0.4 | 5 | 26 | 11.7 | 7.3 | 0.3 |
|  | 350 | 0.4 | 5 | 64 | 7.6 | 7 | 0.5 |
|  | 400 | 0.4 | 5 | 87 | 2.5 | 8.7 | 0.7 |
|  | 500 | 0.4 | 5 | 98 | 4.5 | 9.7 | 0.8 |
|  | 600 | 0.4 | 5 | 100 | 5.4 | 6.5 | 0.9 |
|  | 700 | 0.4 | 5 | 100 | 10.7 | 2.7 | 1 |
|  | 800 | 0.4 | 5 | 100 | 14.1 | 5.2 | 0.8 |
| 6 | 650 | 4.8 | 9 | 85 | 23.7 | 9.1 | 7.3 |
|  | 700 | 5 | 9 | 100 | 24.3 | 10.2 | 9 |
|  | 850 | 5 | 9 | 99 | 7.2 | 0.1 | 10.6 |
|  | 850 | 10 | 9 | 83 | 9.6 | 0.3 | 21.5 |
|  | 850 | 20 | 9 | 88 | 10.1 | 0.7 | 47.1 |
|  | 850 | 40 | 9 | 100 | 10.7 | 2.1 | 107.8 |
|  | 900 | 5 | 9 | 100 | 10.8 | 0.3 | 13 |
| 25 | 700 | 20 | 5 | 100 | 12.9 | 6.2 | 43.5 |
|  | 800 | 20 | 5 | 100 | 14.8 | 5 | 43.9 |
|  | 900 | 20 | 5 | 100 | 18.8 | 0.1 | 53.9 |
| 26 | 600 | 20 | 5 | 77 | 12.5 | 6.8 | 29.3 |
|  | 700 | 20 | 5 | 100 | 13.6 | 4.2 | 41.8 |
|  | 800 | 20 | 5 | 100 | 13.4 | 3.4 | 41.9 |
|  | 900 | 20 | 5 | 100 | 16.6 | 3.9 | 39.5 |
|  | 700 | 40 | 5 | 100 | 27.3 | 6.1 | 65.6 |
|  | 700 | 80 | 5 | 100 | 27 | 10.5 | 113.9 |
|  | 850 | 20 | 4 | 100 | 16.6 | 5.1 | 37.8 |
|  | 850 | 20 | 5 | 100 | 15.3 | 3.9 | 41.7 |
|  | 850 | 20 | 6.5 | 100 | 13.4 | 3.3 | 43.9 |
|  | 850 | 20 | 10 | 100 | 10.6 | 2.6 | 47.5 |
| 27 | 600 | 20 | 5 | 100 | 11 | 5.8 | 41.5 |
|  | 700 | 20 | 5 | 100 | 12.3 | 7.1 | 37.9 |
|  | 800 | 20 | 5 | 100 | 13.2 | 7.1 | 38.2 |
|  | 900 | 20 | 5 | 100 | 16.2 | 4.5 | 44.5 |
| 28 | 600 | 20 | 5 | 98 | 9 | 8.6 | 36.9 |
|  | 700 | 20 | 5 | 100 | 19.5 | 5.3 | 39.9 |
|  | 800 | 20 | 5 | 100 | 13.3 | 6.1 | 39.6 |
|  | 900 | 20 | 5 | 100 | 16.8 | 3.5 | 45.3 |
| 29 | 600 | 20 | 5 | 100 | 16.5 | 9.1 | 34.2 |
|  | 700 | 20 | 5 | 100 | 23.6 | 8 | 55.8 |
|  | 800 | 20 | 5 | 100 | 15.2 | 2.8 | 56.3 |
|  | 900 | 20 | 5 | 100 | 18.7 | 0 | 56.1 |
|  | 700 | 80 | 5 | 100 | 22.3 | 14.5 | 96.1 |
|  | 800 | 80 | 5 | 100 | 18.1 | 4.1 | 167.9 |
| 30 | 600 | 20 | 5 | 100 | 10.6 | 4.5 | 42.2 |
|  | 700 | 20 | 5 | 100 | 13.8 | 3.6 | 46.6 |
|  | 800 | 20 | 5 | 100 | 14.6 | 5.3 | 43.4 |
|  | 900 | 20 | 5 | 97 | 15.5 | 6.5 | 42 |
| 31 | 350 | 2.5 | 7 | 100 | 19.4 | 27.4 | 2.08 |
|  | 400 | 2.5 | 7 | 100 | 1.4 | 25.5 | 2.54 |

Process Flow Diagram (PFD)

Figure 7:
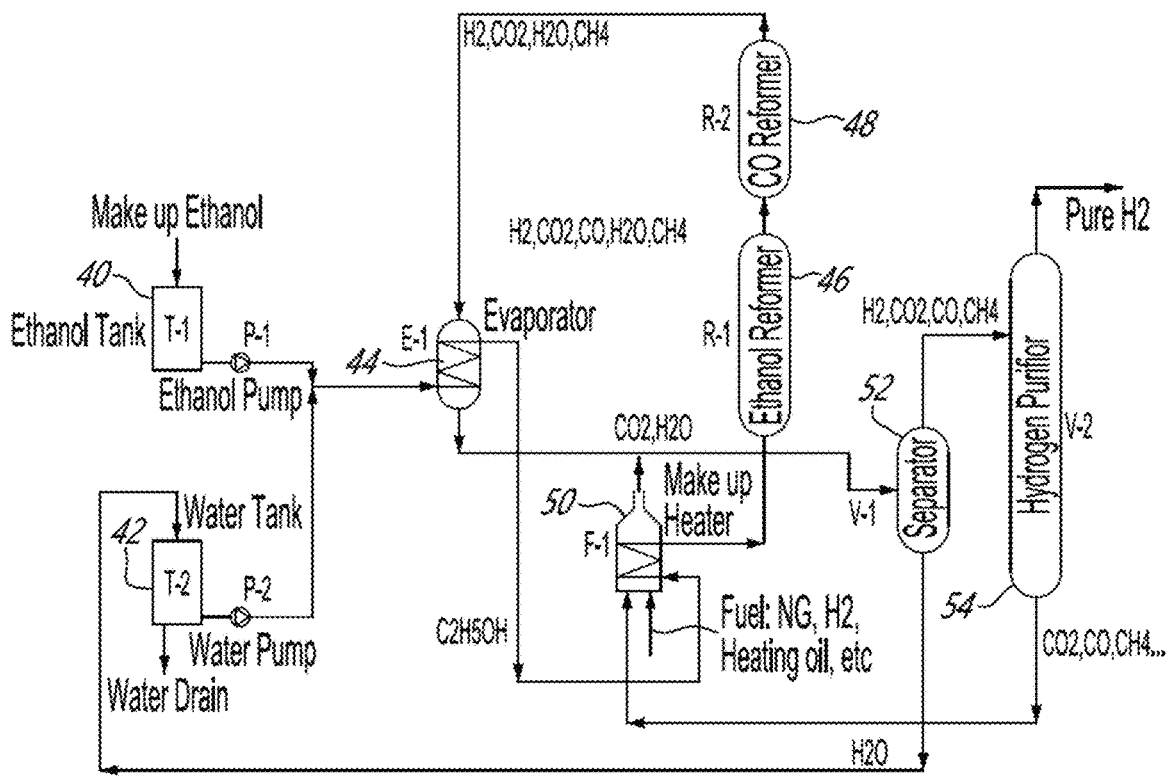
FIG. 7 illustrates an Ethanol Reforming Process Flow Diagram (PFD) for Hydrogen Production using Stationary Units in accordance with one embodiment.

Alcohol Reforming Process Flow Diagram (PFD) for a Stationary Hydrogen Production Unit With reference to FIG. 7, alcohol from feed tank T-1 40 and water from feed tank T-2 42 are fed into heat exchanger/evaporator E-1 44, using pumps P-1 and P-2, heated by mixed hot gas flow exiting from reactor R-2 48. Vaporized feed stream is further heated in makeup heater F-1 50 to reaction temperature before entering reactor R-1 46, where the alcohol and water vapors are converted into H$_2$, CO$_2$, CO, CH$_4$ and in trace amounts of low molecular weight hydrocarbons. Product stream including unreacted water vapors from R-1 46 enters reactor R-2 48 where CO is further converted into H$_2$ and CO$_2$ by water gas shift reaction. After exiting R-2 48 the product stream passes through E-1 44 and then through gas-liquid separator V-1 52. Gas phase from top of the separator V-1 52 enters hydrogen purification column V-2 54. After H$_2$ is separated, remaining combustible gases are combusted as fuel to generate heat in heater F-1 50. Water from bottom of separator V-1 52 return back to water tank 42.

Figure 8:
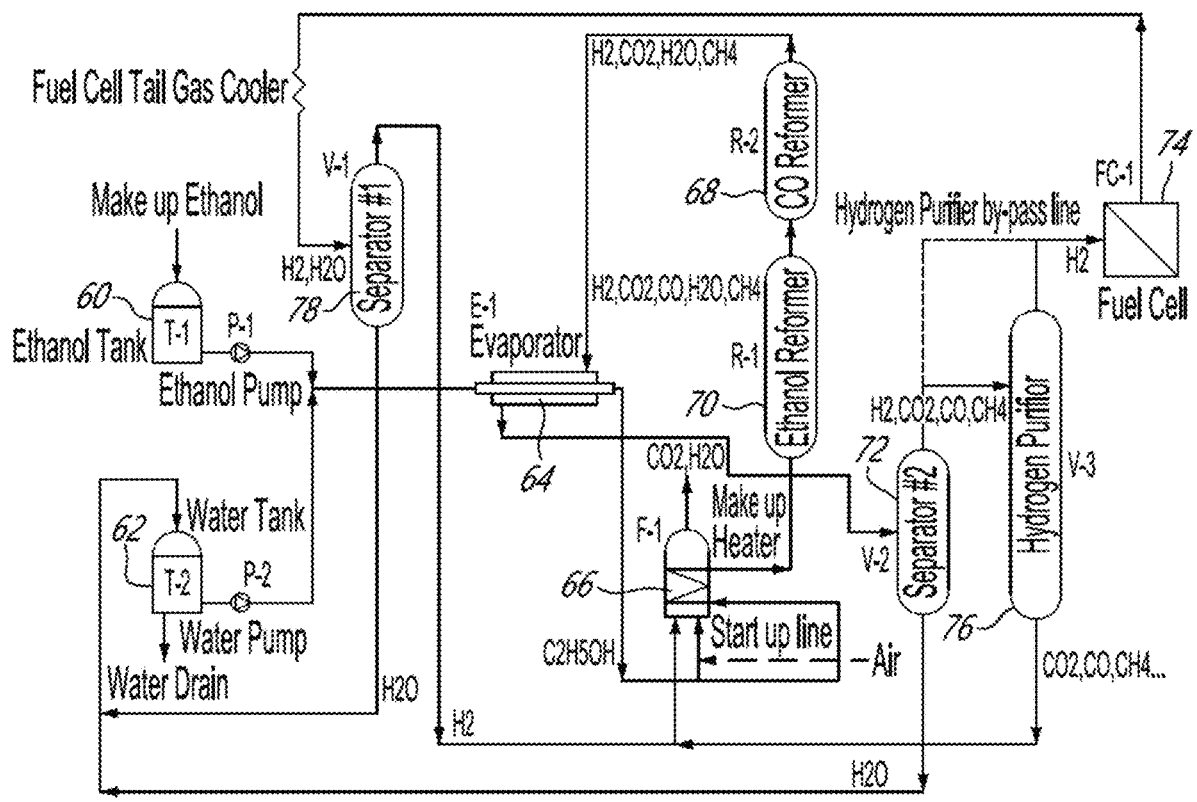
FIG. 8 illustrates a Ethanol Reforming Process Flow Diagram (PFD) for supplying hydrogen to a Fuel Cell Mobile Unit to be used for fuel cell powered vehicles, flying equipment+ or ships in accordance with one embodiment.

Alcohol Reforming Process Flow Diagram (PFD) for On-Board Hydrogen Production for Fuel Cell Powered Electric Vehicles, Flying Equipment and/or Ships With reference to FIG. 8, alcohol from feed tank T-1 60 and water from feed tank T-2 62 are fed into heat exchanger/evaporator E-1 64, using pumps P-1 and P-2, heated by mixed hot gas flow exiting from reactor R-2 68. Vaporized feed stream is further heated in makeup heater F-1 66 to reaction temperature before entering reactor R-1 70, where the alcohol and water vapors are converted into H$_2$, CO$_2$, CO, CH$_4$ and in trace amounts of low molecular weight hydrocarbons. Product stream, including unreacted water vapors, from R-1 70 enters reactor R-2 68 where CO is further converted into H$_2$ and CO$_2$ by water gas shift reaction. After exiting R-2 68 the product stream passes through E-1 64 and gas-liquid separator V-2 72. Gas phase from top of the separator V-2 72 enters directly into the fuel cell FC-1 74, if the fuel cell can tolerate presence of CO and $CO_2$ in the incoming hydrogen stream. Optionally, in case fuel cell is sensitive to the presence of non-hydrogen gases, then hydrogen stream can be pretreated by passing through hydrogen purification column V-3 76 to eliminate non-hydrogen gases from hydrogen stream prior to feeding into the fuel cell 74. After $H_2$ is separated, remaining combustible gases are mixed with unreacted hydrogen from fuel cell tail gas separator V-1 78 and combusted as fuel to generate heat in heater F-1 66. Water from separator V-1 78 and separator V-2 72 returns back to feed water tank 62.

Example III

Process Conditions

With reference to FIG. 1, the process conditions including temperature, flow rate (specifically, weight hourly space velocity (WHSV)) as well as water/methanol ratio were evaluated by using catalysts from Table 1 at atmosphere pressure.

Figure 3:
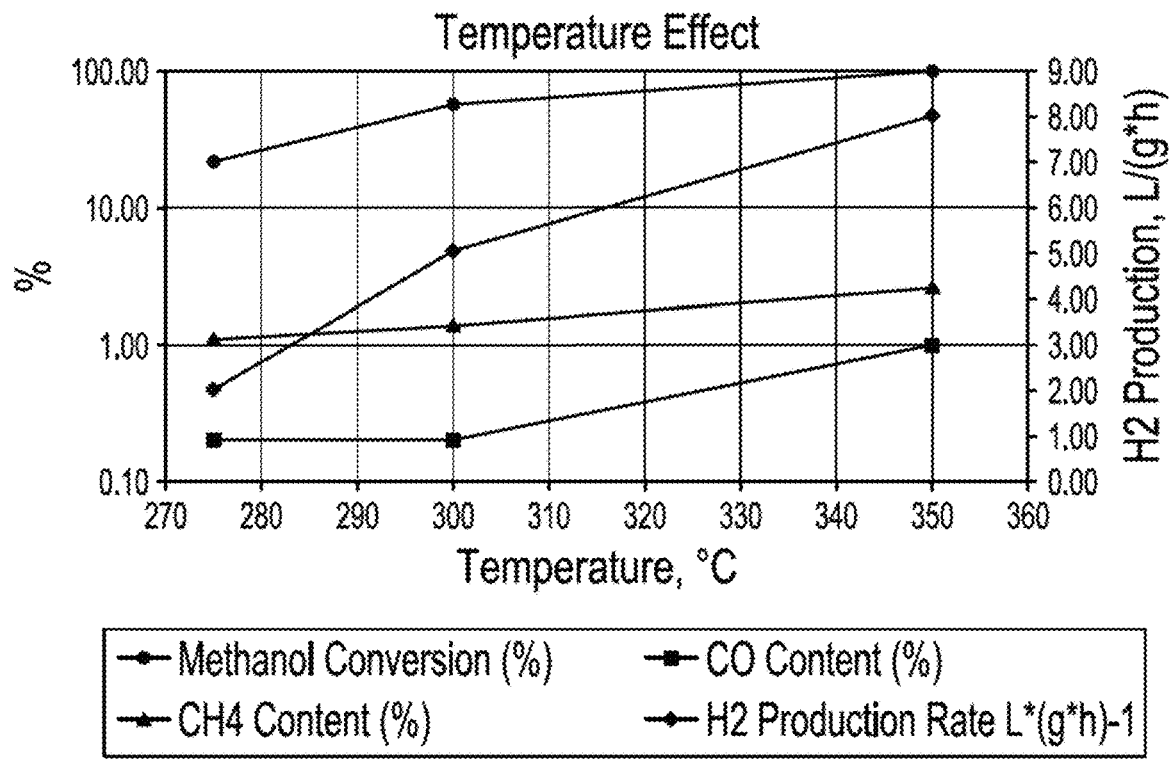
FIG. 3 shows a plot of temperature vs. methanol conversion, carbon monoxide content, methane content and hydrogen production rate in the product stream for methanol steam reforming in the system of FIG. 1, in accordance with one embodiment.

The impact of the process temperature was assessed by using catalyst 17 under atmospheric pressure, while keeping the WHSV and water/methanol ratios constant. The results are presented in Table 6 and FIG. 3.

TABLE 6

Temperature Effect

| Temperature (° C.) | WHSV of MeOH ($h^{-1}$) | $H_2O$/MeOH Ratio | Methanol Conversion (%) | CO Content (%) | $CH_4$ Content (%) | $H_2$ Production Rate ($Lg^{-1} h^{-1}$) |
|---|---|---|---|---|---|---|
| 275 | 0.95 | 1.17 | 22 | 0.20 | 1.10 | 2.02 |
| 300 | 0.95 | 1.17 | 57 | 0.20 | 1.40 | 5.05 |
| 350 | 0.95 | 1.17 | 100 | 1.00 | 2.60 | 8.02 |

Figure 4:
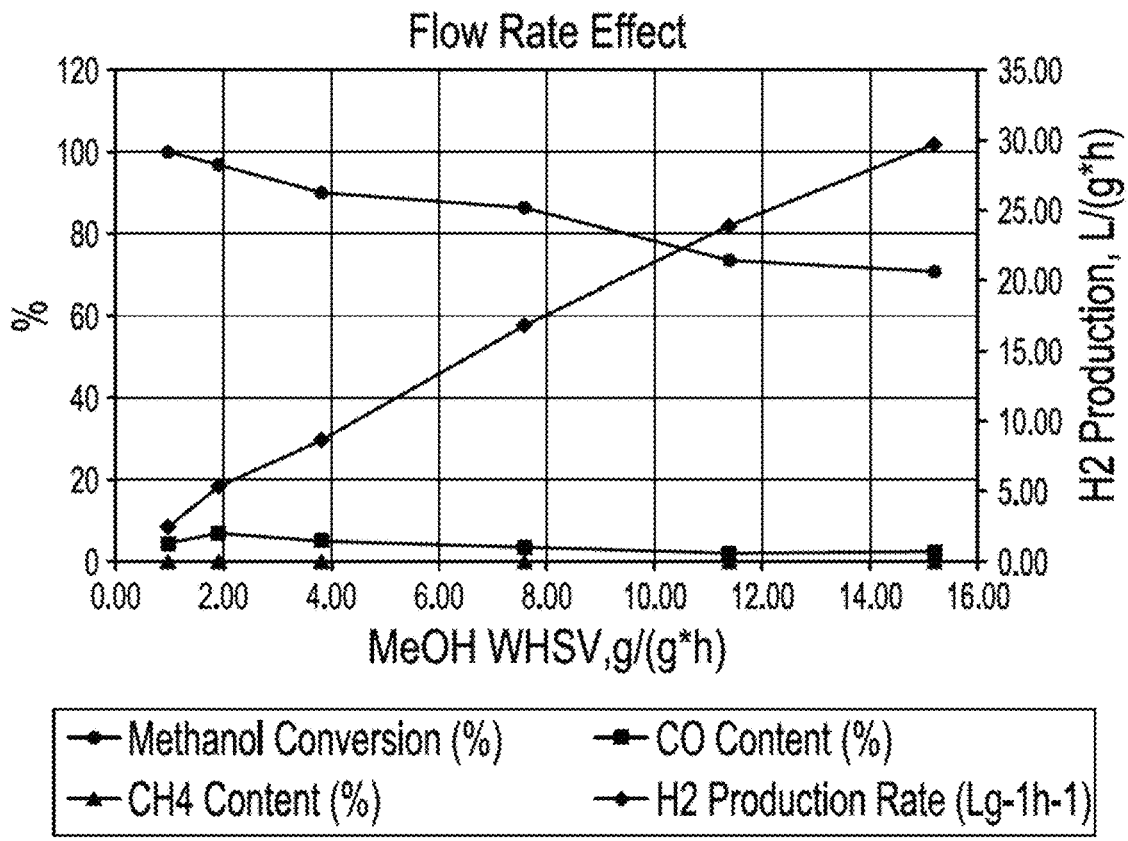
FIG. 4 shows a plot of weight hour space velocity (WHSV) vs. methanol conversion, carbon monoxide content, methane content and hydrogen production rate in the product stream for methanol steam reforming in the system of FIG. 1, in accordance with one embodiment.

The impact of the WHSV of methanol was further evaluated by using catalyst 16 under atmospheric pressure, while keeping the temperature constant at and water/methanol ratios constant. The results are presented in Table 7 and FIG. 4.

TABLE 7

Methanol WHSV Effect

| WHSV of MeOH ($h^{-1}$) | Temperature (° C.) | $H_2O$/MeOH Ratio | Methanol Conversion (%) | CO Content (%) | $CH_4$ Content (%) | $H_2$ Production Rate ($Lg^{-1} h^{-1}$) |
|---|---|---|---|---|---|---|
| 0.95 | 300 | 1.2 | 100 | 4.4 | 0 | 2.39 |
| 1.90 | 300 | 1.2 | 97 | 6.8 | 0 | 5.34 |
| 3.79 | 300 | 1.2 | 90 | 4.9 | 0 | 8.64 |
| 7.58 | 300 | 1.2 | 86 | 3.5 | 0 | 16.84 |
| 11.38 | 300 | 1.2 | 73 | 1.9 | 0 | 23.94 |
| 15.17 | 300 | 1.2 | 71 | 2.4 | 0 | 29.70 |

Figure 5:
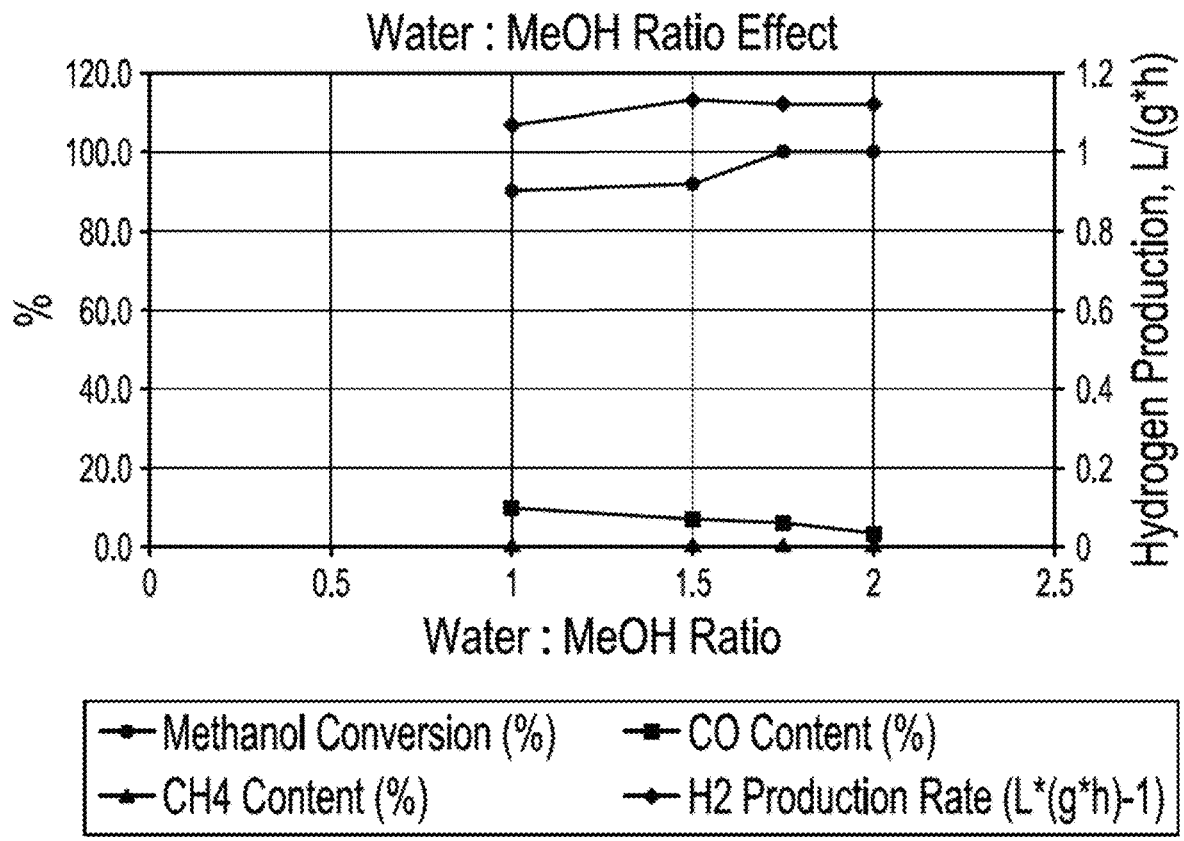
FIG. 5 shows a plot of water/methanol ratio vs. methanol conversion, carbon monoxide content, methane content and hydrogen production rate in the product stream for methanol steam reforming in the system of FIG. 1, in accordance with one embodiment.

The impact of the water/methanol ratio was also investigated by using catalyst 1 under atmospheric pressure, while keeping the temperature and WHSV of methanol constant. The results are presented in Table 8 and FIG. 5.

TABLE 8

$H_2O$/MeOH Ratio Effect

| $H_2O$/MeOH Ratio | Temperature (° C.) | WHSV of MeOH ($h^{-1}$) | Methanol Conversion (%) | CO Content (%) | $CH_4$ Content (%) | $H_2$ Production Rate ($Lg^{-1} h^{-1}$) |
|---|---|---|---|---|---|---|
| 1 | 300 | 0.48 | 90 | 9.7 | 0.1 | 1.07 |
| 1.5 | 300 | 0.48 | 92 | 7.2 | 0.1 | 1.13 |
| 1.75 | 300 | 0.48 | 100 | 6.2 | 0.1 | 1.12 |
| 2 | 300 | 0.48 | 100 | 3.4 | 0.1 | 1.12 |

Example IV

Ethanol Steam Reforming

Figure 6:
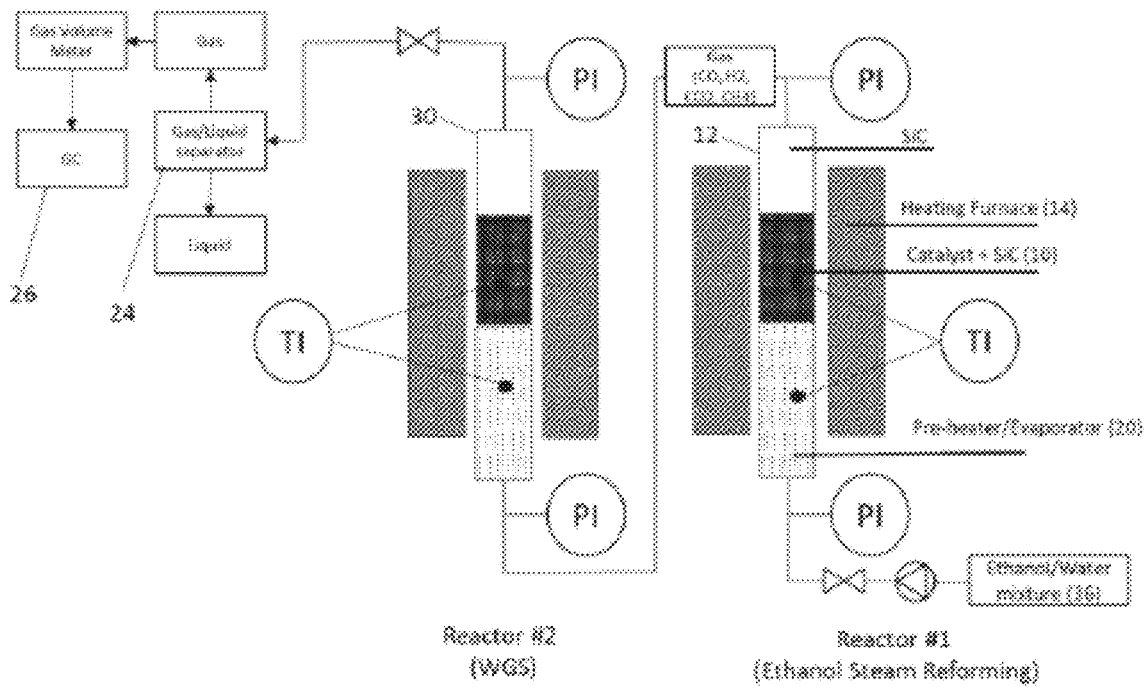
FIG. 6 shows a system for ethanol steam reforming for screening solid, heterogeneous catalysts in two connected reactors in accordance with one embodiment.

With reference to FIG. 6, the process conditions including temperature, flow rate (specifically, weight hourly space velocity (WHSV)) as well as water/methanol ratio were evaluated by using catalysts from table 1.

Figure 9:
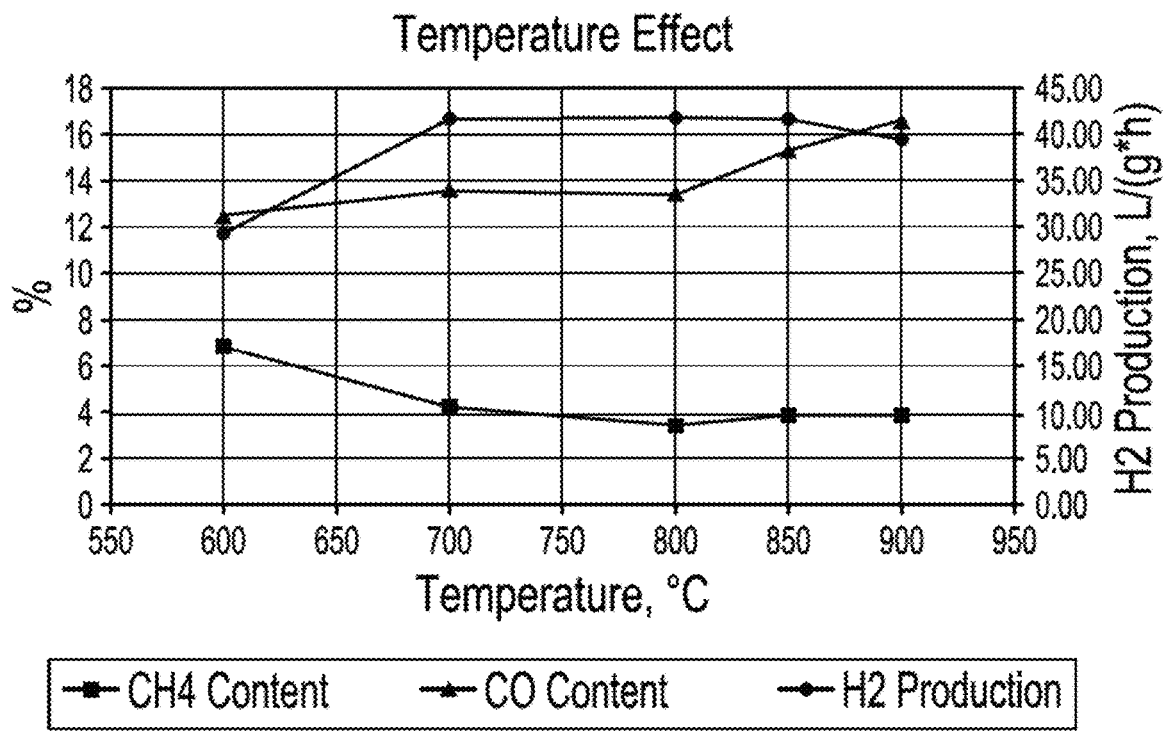
FIG. 9 shows a plot of temperature vs. carbon monoxide content, methane content and hydrogen production rate in the product stream for ethanol steam reforming in the system of FIG. 6, in accordance with one embodiment.

The impact of the process temperature was assessed by using catalyst 26 under atmospheric pressure, while keeping the WHSV and the water/ethanol ratios constant. The results are presented in Table 9 and FIG. 9.

TABLE 9

Temperature Effect

| Temperature (° C.) | WHSV of Ethanol ($h^{-1}$) | $H_2O$/Ethanol Ratio | Ethanol Conversion (%) | CO Content (%) | $CH_4$ Content (%) | $H_2$ Production Rate ($Lg^{-1} h^{-1}$) |
| --- | --- | --- | --- | --- | --- | --- |
| 600 | 20 | 5 | 78  | 12.5 | 6.81 | 29.32 |
| 700 | 20 | 5 | 100 | 13.6 | 4.25 | 41.81 |
| 800 | 20 | 5 | 99  | 13.4 | 3.45 | 41.93 |
| 850 | 20 | 5 | 100 | 15.3 | 3.92 | 41.7  |
| 900 | 20 | 5 | 99  | 16.6 | 3.88 | 39.52 |

Figure 10:
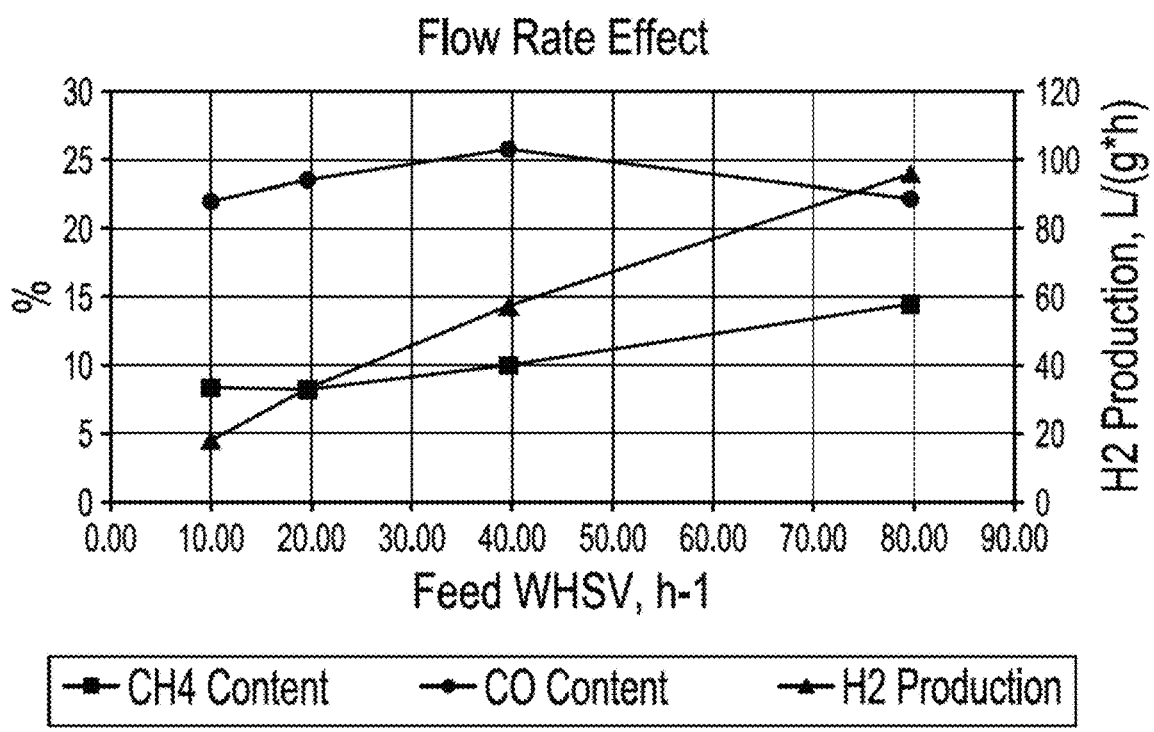
FIG. 10 shows a plot of weight hour space velocity (WHSV) vs. carbon monoxide content, methane content and hydrogen production rate in the product stream for ethanol steam reforming in the system of FIG. 6, in accordance with one embodiment.

The impact of the WHSV of ethanol was further evaluated by using catalyst 28 under atmospheric pressure, while keeping the temperature and the water/ethanol ratios constant The results are presented in Table 10 and FIG. 10.

TABLE 10

Ethanol WHSV Effect

| WHSV of Ethanol ($h^{-1}$) | Temperature (° C.) | $H_2O$/Ethanol Ratio | Ethanol Conversion (%) | CO Content (%) | $CH_4$ Content (%) | $H_2$ Production Rate ($Lg^{-1} h^{-1}$) |
| --- | --- | --- | --- | --- | --- | --- |
| 80 | 700 | 5 | 100 | 22.3 | 14.5 | 96.1 |
| 40 | 700 | 5 | 98  | 25.9 | 10.1 | 57.4 |
| 20 | 700 | 5 | 100 | 23.6 | 8.2  | 33.2 |
| 10 | 700 | 5 | 100 | 22.1 | 8.4  | 17.9 |

Figure 11:
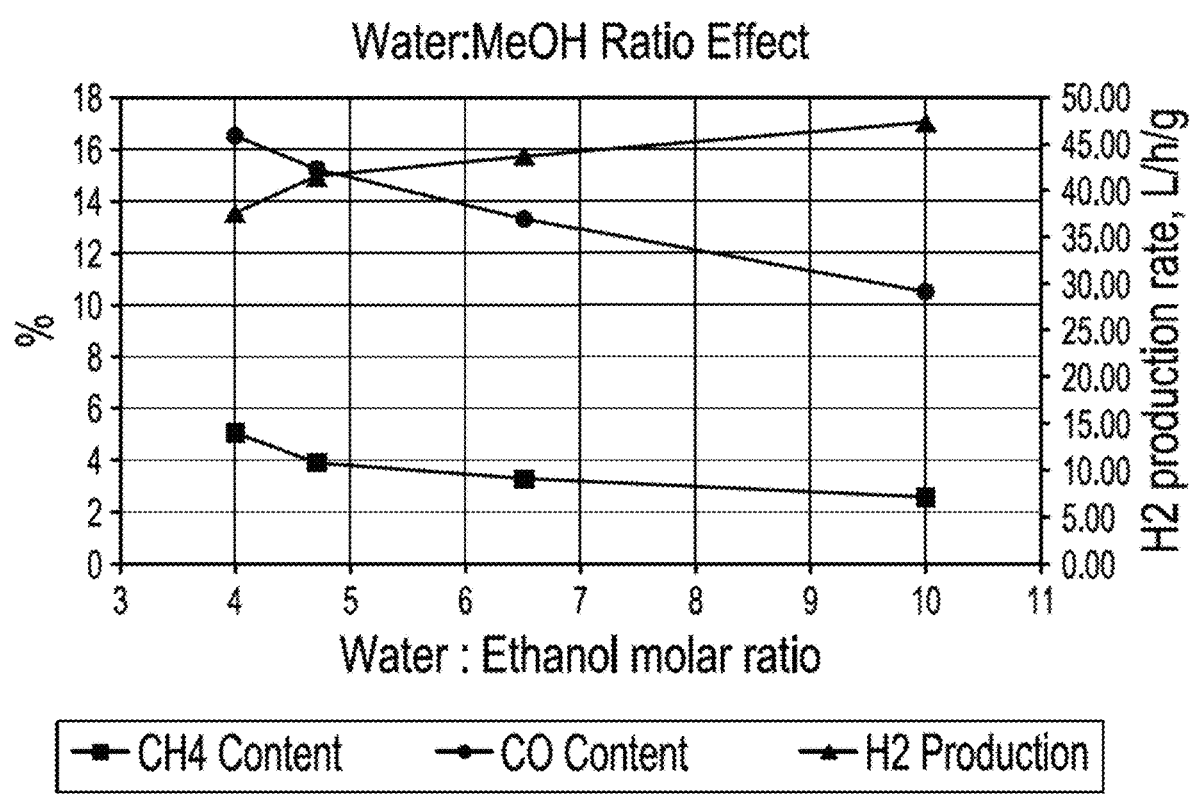
FIG. 11 shows a plot of water/ethanol ratio vs. carbon monoxide content, methane content and hydrogen production rate in the product stream for ethanol steam reforming in the system of FIG. 6, in accordance with one embodiment.

The impact of the changing water/ethanol ratio was also investigated by using catalyst 26 under atmospheric pressure, while keeping the temperature and WHSV of ethanol. The results are presented in Table 11 and FIG. 11.

TABLE 11

$H_2O$/Ethanol Ratio Effect

| $H_2O$/Ethanol Ratio | Temperature (° C.) | WHSV of Ethanol ($h^{-1}$) | Ethanol Conversion (%) | CO Content (%) | $CH_4$ Content (%) | $H_2$ Production Rate ($Lg^{-1} h^{-1}$) |
| --- | --- | --- | --- | --- | --- | --- |
| 4   | 850 | 20 | 100 | 16.6 | 5.09 | 37.80 |
| 4.7 | 850 | 20 | 100 | 15.3 | 3.92 | 41.70 |
| 6.5 | 850 | 20 | 100 | 13.4 | 3.3  | 43.91 |
| 10  | 850 | 20 | 100 | 10.6 | 2.58 | 47.53 |

The impact of reaction pressure on reaction performance was investigated by keeping the temperature and WHSV of ethanol constant. The results are presented in Table 12.

TABLE 12

Reaction Pressure Effect

| Catalyst Number | Pressure | Ethanol Conversion (%) | CO Content (%) | CH$_4$ Content (%) | H$_2$ Production Rate (Lg$^{-1}$ h$^{-1}$) |
|---|---|---|---|---|---|
| 12* | 20 | 100 | 1.2 | 2.9 | 1.4 |
|  | 500 | 99 | 0.6 | 4.4 | 1.2 |
|  | 1000 | 75 | 4 | 9.8 | 0.79 |
| 25 | 20 | 100 | 12.9 | 6.2 | 43.5 |
|  | 500 | 100 | 7.20 | 20.3 | 24.5 |
| 26 | 20 | 100 | 13.6 | 4.2 | 41.8 |
|  | 500 | 81 | 8.80 | 14.4 | 22.0 |
| 27 | 20 | 100 | 12.3 | 7.1 | 37.9 |
|  | 500 | 99 | 8.10 | 14.7 | 26.5 |
| 28 | 20 | 100 | 19.5 | 5.3 | 39.9 |
|  | 500 | 95 | 12.60 | 12.1 | 27.6 |
| 29 | 20 | 100 | 23.6 | 8.0 | 55.8 |
|  | 500 | 94 | 8.20 | 16.0 | 25.0 |
| 30 | 20 | 100 | 13.8 | 3.6 | 46.6 |
|  | 500 | 98 | 8.70 | 15.1 | 33.0 |

*Reaction conditions: Temperature - 850° C., WHSV of ethanol 0.4 h$^{-1}$.

While the present disclosure has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A catalyst for producing H$_2$ by steam reforming of a carbonaceous material, having a formula $Cu_aNi_bFe_cCo_dMo_eMn_fMg_gZr_hLa_iCe_jTi_kZn_lW_mO_x$, wherein $0 \le a \le 0.32$, $0 \le b \le 0.19$, $0 \le c \le 0.29$, $0 \le d \le 0.16$, $0 \le e \le 0.11$, $0 \le f \le 0.21$, $0 \le g \le 0.32$, $0.23 \le h \le 0.42$, $0.01 \le i \le 0.02$, $0.03 \le j \le 0.10$, $0.11 \le k \le 0.20$, $0.11 \le l \le 0.19$, and $0 \le m \le 0.04$; or $0 \le a \le 0.32$, $0 \le b \le 0.19$, $0 c \le 0.29$, $0 \le d \le 0.16$, $0 \le e \le 0.11$, $0 \le f \le 0.21$, $0 \le g \le 0.32$, $0.23 \le h \le 0.42$, $0 \le i \le 0.02$, $0 \le j \le 0.10$, $0.11 \le k \le 0.20$, $0.11 \le l \le 0.19$, $0 < m \le 0.04$, and x is such that the catalyst is electrically neutral.

2. The catalyst of claim 1, wherein $a+b+c+d+e+f+g+h+i+j+k+l=1$.

3. The catalyst of claim 1, wherein the metal oxidation state is Cu 0, +1 or +2; Ni 0 or +2; Co 0 or +2; Mo 0 or +2; Mn 0, +2, +3 or +4; Mg 0 or +2; Mn +5, +6 or +7; Fe 0, +2 or +3; Ti 0, +2, +3 or +4; Zn 0, +1 or +2; Zr 0 or +4; La 0 or +3; Ce 0, +3 or +4; W 0 or +3, or combination thereof.

4. The catalyst of claim 1, wherein the catalyst is one of:
$Cu_{0.16}Ni_{0.16}Zr_{0.32}La_{0.01}Ce_{0.05}Ti_{0.15}Zn_{0.15}O_x$;
$Cu_{0.11}Ni_{0.19}Fe_{0.21}Zr_{0.23}La_{0.01}Ce_{0.03}Ti_{0.11}Zn_{0.11}O_x$;
$Cu_{0.17}Fe_{0.09}Zr_{0.35}La_{0.02}Ce_{0.05}Ti_{0.16}Zn_{0.16}O_x$;
$Cu_{0.08}Ni_{0.08}Fe_{0.06}CO_{0.12}Zr_{0.31}La_{0.01}Ce_{0.04}Ti_{0.15}Zn_{0.14}O_x$;
$Cu_{0.19}Zr_{0.38}La_{0.02}Ce_{0.05}Ti_{0.18}Zn_{0.18}O_x$;
$Ni_{0.19}Zr_{0.38}La_{0.02}Ce_{0.05}Ti_{0.18}Zn_{0.17}O_x$;
$Cu_{0.18}Ni_{0.07}Zr_{0.36}La_{0.02}Ce_{0.05}Ti_{0.17}Zn_{0.16}O_x$;
$Cu_{0.07}Ni_{0.18}Zr_{0.36}La_{0.02}Ce_{0.05}Ti_{0.17}Zn_{0.16}O_x$;
$Cu_{0.32}Zr_{0.32}La_{0.01}Ce_{0.05}Ti_{0.15}Zn_{0.15}O_x$;
$Cu_{0.27}Ni_{0.04}Fe_{0.10}Zr_{0.28}La_{0.01}Ce_{0.04}Ti_{0.13}Zn_{0.13}O_x$;
$Fe_{0.15}Zr_{0.40}La_{0.02}Ce_{0.06}Ti_{0.19}Zn_{0.19}O_x$;
$Cu_{0.15}Co_{0.16}Zr_{0.32}La_{0.01}Ce_{0.05}Ti_{0.15}Zn_{0.15}O_x$;
$Cu_{0.26}Fe_{0.15}Zr_{0.28}La_{0.01}Ce_{0.04}Ti_{0.13}Zn_{0.13}O_x$;
$Cu_{0.23}Fe_{0.26}Zr_{0.24}La_{0.01}Ce_{0.03}Ti_{0.11}Zn_{0.11}O_x$;
$Cu_{0.13}Fe_{0.29}Zr_{0.27}La_{0.01}Ce_{0.04}Ti_{0.13}Zn_{0.13}O_x$;
$Cu_{0.15}Mn_{0.17}Zr_{0.32}La_{0.01}Ce_{0.05}Ti_{0.15}Zn_{0.15}O_x$;
$Cu_{0.16}Mo_{0.11}Zr_{0.34}La_{0.02}Ce_{0.05}Ti_{0.16}Zn_{0.16}O_x$;
$Cu_{0.12}Mg_{0.32}Zr_{0.26}La_{0.01}Ce_{0.04}Ti_{0.12}Zn_{0.12}O_x$;
$Cu_{0.09}Fe_{0.09}Co_{0.09}Zr_{0.35}La_{0.02}Ce_{0.05}Ti_{0.16}Zn_{0.16}O_x$;
$Cu_{0.15}Fe_{0.17}Zr_{0.32}La_{0.01}Ce_{0.05}Ti_{0.15}Zn_{0.15}O_x$;
$Ni_{0.17}Fe_{0.13}Mn_{0.19}Zr_{0.33}La_{0.01}Ce_{0.05}Ti_{0.16}Zn_{0.15}O_x$;
$Fe_{0.19}Zr_{0.38}La_{0.02}Ce_{0.05}Ti_{0.18}Zn_{0.18}O_x$;
$Mn_{0.21}Zr_{0.38}La_{0.02}Ce_{0.05}Ti_{0.18}Zn_{0.17}O_x$;
$Cu_{0.08}Co_{0.09}Mn_{0.09}Zr_{0.35}La_{0.02}Ce_{0.05}Ti_{0.16}Zn_{0.16}O_x$;
$Ni_{0.10}Mn_{0.10}Zr_{0.38}La_{0.02}Ce_{0.05}Ti_{0.18}Zn_{0.17}O_x$;
$Co_{0.11}Zr_{0.42}La_{0.02}Ce_{0.06}Ti_{0.20}Zn_{0.19}O_x$;
$Fe_{0.1}Co_{0.10}Zr_{0.38}La_{0.02}Ce_{0.05}Ti_{0.18}Zn_{0.17}O_x$;
$Co_{0.10}Zr_{0.40}La_{0.02}Ce_{0.10}Ti_{0.19}Zn_{0.19}O_x$;
$Ni_{0.1}Co_{0.10}Zr_{0.38}La_{0.02}Ce_{0.05}Ti_{0.18}Zn_{0.17}O_x$;
$Co_{0.10}Mn_{0.10}Zr_{0.37}La_{0.02}Ce_{0.05}Ti_{0.18}Zn_{0.17}O_x$; or
$Cu_{0.13}Ni_{0.09}Zr_{0.39}Ti_{0.18}Zn_{0.18}W_{0.04}O_x$;
wherein x is such that the catalyst is electrically neutral.

5. The catalyst of claim 1, wherein the catalyst has a surface area between about 10 m$^2$/g and about 500 m$^2$/g, and/or a total pore volume between about 0.01 mL/g and about 1 mL/g.

6. The catalyst of claim 1, wherein the catalyst is in powdered, pelleted, extruded form or coated on a metal or any suitable surface with or without an added binder.

7. A method for producing H$_2$ by steam reforming of a carbonaceous material, comprising contacting and reacting said carbonaceous material and water with a solid catalyst as defined in claim 1, producing hydrogen.

8. The method of claim 7, wherein the carbonaceous material and water are in a gas phase.

9. The method of claim 7, wherein the carbonaceous material comprises methanol, ethanol, propanol, butanol, diethyl ether, dimethyl ether, glycerol, glycol, methane, ethane, butane, gasoline, diesel, a naphtha, kerosene, or a combination thereof.

10. The method of claim 8, wherein the gas phase further comprise oxygen or air diluted with an inert gas.

11. The method of claim 10, wherein the inert gas is nitrogen or argon.

12. The method of claim 7, wherein hydrogen is produced by a methanol decomposition reaction, by a water gas shift reaction, by a methanol steam reforming reaction, by an ethanol steam reforming reaction, or by a oxidative methanol, oxidative ethanol reforming and/or ethanol steam reforming reaction.

13. The method of claim 7, further producing carbon monoxide and/or carbon dioxide.

14. The method of claim 7, wherein the reaction is conducted at temperatures between 150° C. and 1,000° C.

15. The method of claim 7, wherein the reaction is conducted at greater than or equal to atmospheric pressure.

16. The method of claim 7, wherein the reaction is conducted with H$_2$O to methanol ratio in the gas phase equal to or greater than 1; or is conducted with H$_2$O to ethanol ratio in the gas phase equal to or greater than 3.

17. The method of claim 7, wherein the reaction is conducted in a fixed bed reactor or on a catalyst coated surface.

18. The method of claim 7, wherein the reaction is conducted in one stage or two or more successive stages.

19. The method of claim 7, wherein the reaction is conducted with a WHSV of methanol between about 0.1 to 30 hr$^{-1}$.

20. The method of claim 7, wherein the reaction is conducted with a WHSV of ethanol between about 1 to about 150 hr$^{-1}$.

* * * * *